(12) United States Patent
Yashiro

(10) Patent No.: US 11,731,624 B2
(45) Date of Patent: Aug. 22, 2023

(54) VEHICLE CONTROLLER, VEHICLE, AND VEHICLE CONTROL METHOD

(71) Applicant: HONDA MOTOR CO., LTD., Tokyo (JP)

(72) Inventor: Katsuya Yashiro, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 112 days.

(21) Appl. No.: 16/830,833

(22) Filed: Mar. 26, 2020

(65) Prior Publication Data

US 2020/0307584 A1 Oct. 1, 2020

(30) Foreign Application Priority Data

Mar. 27, 2019 (JP) .................................. 2019-061509

(51) Int. Cl.
*B60W 30/165* (2020.01)
*B60W 50/08* (2020.01)
*B60W 10/11* (2012.01)

(52) U.S. Cl.
CPC .......... *B60W 30/165* (2013.01); *B60W 10/11* (2013.01); *B60W 50/08* (2013.01);
(Continued)

(58) Field of Classification Search
CPC .... B60W 30/165; B60W 10/11; B60W 50/08; B60W 2554/4029; B60W 2554/802
See application file for complete search history.

(56) References Cited

U.S. PATENT DOCUMENTS 6,314,341 B1 * 11/2001 Kanayama ........... G05D 1/0221
701/4
9,607,454 B1 3/2017 Raghu et al.
(Continued)

FOREIGN PATENT DOCUMENTS

CN 106652471 A 5/2017
EP 3 581 449 A1 12/2019
(Continued)

OTHER PUBLICATIONS

Office Action received in corresponding Japanese application No. 2019-061509 dated Feb. 2, 2021 with English abstract (9 pages).
(Continued)

*Primary Examiner* — Jelani A Smith
*Assistant Examiner* — Frank T Glenn, III
(74) *Attorney, Agent, or Firm* — Rankin, Hill & Clark LLP

(57) ABSTRACT

A vehicle controller of a subject vehicle includes a processor that: recognizes a surrounding state of the subject vehicle traveling in a lane on a road; detects a specific target object in a specific area; provides control such that the subject vehicle follows a vehicle traveling ahead thereof; and makes the subject vehicle operate in at least one of a first support status and a second support status having an automated degree higher than the first and realized only when the subject vehicle is traveling in the specific area. When the subject vehicle is traveling in the specific area in the first support status and the specific target object has been detected therein, the processor keeps the support status of the subject vehicle unchanged at the first support status; and, in the second support status, shifts the support status of the subject vehicle to the first support status.

8 Claims, 17 Drawing Sheets

(52) U.S. Cl.
CPC .............. *B60W 2554/4029* (2020.02); *B60W 2554/802* (2020.02)

(56) References Cited

U.S. PATENT DOCUMENTS

| | | | |
|---|---|---|---|
| 9,671,782 B2 | 6/2017 | Yamaoka et al. | |
| 2014/0309833 A1 | 10/2014 | Ferguson et al. | |
| 2015/0355640 A1 | 12/2015 | Ferguson et al. | |
| 2016/0179092 A1* | 6/2016 | Park .................... | B60W 40/09 701/23 |
| 2017/0001650 A1* | 1/2017 | Park .................... | B60W 30/06 |
| 2017/0176996 A1 | 6/2017 | Ferguson et al. | |
| 2017/0286782 A1 | 10/2017 | Pillai et al. | |
| 2017/0334451 A1* | 11/2017 | Asakura ............... | G05D 1/0088 |
| 2018/0047285 A1* | 2/2018 | Johnson ............ | G08G 1/096716 |
| 2018/0170429 A1* | 6/2018 | Shimizu ............... | B60W 30/09 |
| 2018/0244174 A1* | 8/2018 | Tan ..................... | B60N 2/22 |
| 2018/0292833 A1 | 10/2018 | You et al. | |
| 2018/0326982 A1* | 11/2018 | Paris .............. | B60W 30/18154 |
| 2019/0073907 A1* | 3/2019 | Takaki ............. | B60W 30/0956 |
| 2019/0108753 A1* | 4/2019 | Kaiser ................. | G08G 1/0141 |
| 2019/0135281 A1* | 5/2019 | Miura ................ | B60W 30/165 |
| 2019/0258261 A1 | 8/2019 | Ferguson et al. | |
| 2020/0094829 A1* | 3/2020 | Ohmura .............. | B60W 30/143 |
| 2020/0148205 A1 | 5/2020 | Yoshida et al. | |
| 2020/0189572 A1* | 6/2020 | Rowell ................. | B60W 50/10 |

FOREIGN PATENT DOCUMENTS

| | | |
|---|---|---|
| JP | 2004-110416 A | 4/2004 |
| JP | 2006-264465 A | 10/2006 |
| JP | 6176263 B2 | 8/2017 |
| JP | 2017-182565 A | 10/2017 |
| JP | 2017-188099 A | 10/2017 |
| JP | 2017-207859 A | 11/2017 |
| JP | 2018-154216 A | 10/2018 |
| JP | 2018-154338 A | 10/2018 |
| WO | 2019/043847 A1 | 3/2019 |

OTHER PUBLICATIONS

Office Action received in corresponding CN application No. 202010167173.8 dated Dec. 28, 2022 with English translation (15 pages).

* cited by examiner

VEHICLE CONTROLLER, VEHICLE, AND VEHICLE CONTROL METHOD

CROSS REFERENCE TO RELATED APPLICATIONS

This application claims the benefit of Japanese Patent Application No. 2019-061509 filed on Mar. 27, 2019, the disclosure of which is incorporated herein by reference.

TECHNICAL FIELD

The present invention relates to a vehicle controller, a vehicle, and a vehicle control method.

BACKGROUND ART

Japanese Patent Publication No. 6176263 (which may also be referred to as Patent Document 1) discloses an autonomous driving device that includes a control unit configured to control switching between manual driving and autonomous driving of a vehicle, and a detection unit configured to detect a driving operation by a driver of the vehicle. When the driving operation value of the driving operation is less than or equal to a manual driving switching threshold value during autonomous driving, the control unit continues to perform autonomous driving. When the driving operation value of the driving operation exceeds the manual driving switching threshold value during autonomous driving, the control unit switches autonomous driving to manual driving. When autonomous driving is switched to manual driving due to the driving operation value exceeding the manual driving switching threshold value, and a driving operation time from when the driving operation value exceeds a timing start threshold value to when the driving operation value is less than or equal to an autonomous driving switching threshold value is less than or equal to an operation time threshold value, the control unit switches manual driving to autonomous driving.

RELATED ART DOCUMENT

Patent Document

[Patent Document 1] Japanese Patent Publication No. 6176263

SUMMARY OF THE INVENTION

Problem to be Solved by the Invention

In the conventional technology, however, the automated driving device as described above is designed assuming that there are no people on expressways in principle. Thus, if a human or humans are detected on an expressway, the automated driving device as described above has a problem that a driver of a vehicle is required to make an appropriate response by himself/herself.

In light of the problem described above, the present invention has been made in an attempt to provide a vehicle controller, a vehicle, and a vehicle control method, in each of which a driving support status of the vehicle can be promptly shifted, when a specific target object such as a human is detected in a specific area in which such a specific target object is not supposed to be present.

A vehicle controller of a subject vehicle includes: a recognition unit configured to recognize a surrounding state of the subject vehicle which travels in a lane on a road; a detection unit configured to detect a specific target object in a specific area into which entry of the specific target object is restricted; and a driving control part configured to provide control such that the subject vehicle follows a vehicle traveling ahead thereof, based on a result detected by the detection unit. The driving control part is configured to: make the subject vehicle operate at at least one of a first support status, and a second support status which has an automated degree higher than that of the first support status or has a task required to be done by a vehicle occupant of the subject vehicle less than that of the first support status; when the subject vehicle is traveling in the specific area at the first support status and the detection unit has detected therein a specific target object, keep the support status of the subject vehicle unchanged at the first support status; and, when the subject vehicle is traveling in the specific area at the second support status and the detection unit has detected therein a specific target object, shift the support status of the subject vehicle from the second support status to the first support status.

Advantageous Effects of the Invention

The present invention can provide a vehicle controller, a vehicle, and a vehicle control method, in each of which a driving support status of the vehicle can be promptly shifted, when a specific target object such as a human is detected in a specific area in which such a specific target object is not supposed to be present.

DETAILED DESCRIPTION OF THE EMBODIMENTS

An embodiment of the present invention is described in detail below with reference to related drawings. Explanation below is made assuming a country or a region where a rule of left-hand traffic is applied to. In other country or region where a rule of right-hand traffic is applied to, the explanation is also available with right and left exchanged with each other.

Embodiment

Figure 1:
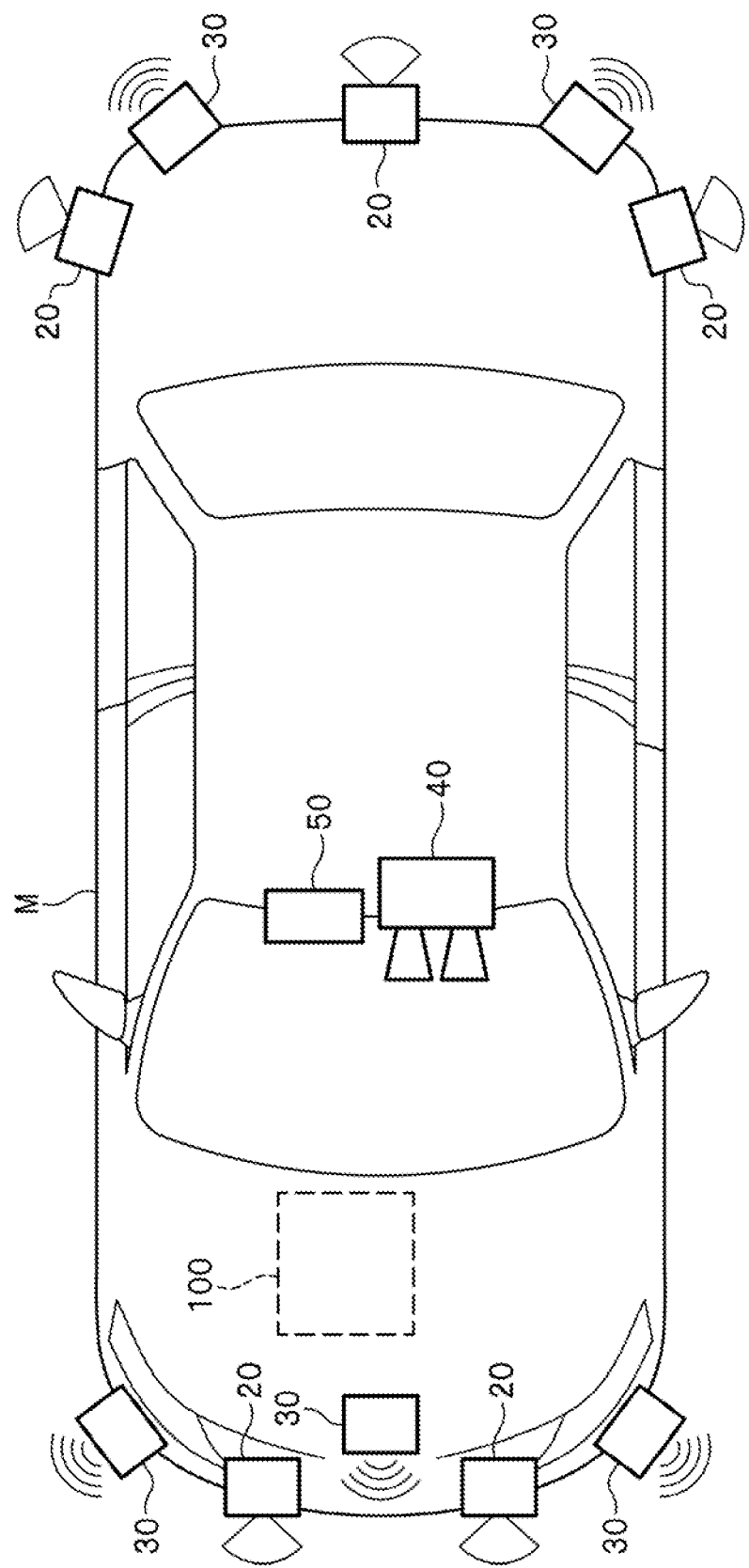
FIG. 1 is a diagram illustrating an entire structure of a vehicle which includes a vehicle controller according to an embodiment of the present invention.

FIG. 1 is a diagram illustrating an entire structure of a vehicle which includes a vehicle controller 100 according to an embodiment of the present invention. The vehicle of interest (which may also be referred to as a subject vehicle M hereinafter) in which the vehicle controller 100 is mounted is, for example, a two-wheeled vehicle, a three-wheeled vehicle, a four-wheeled vehicle, or the like, and may be: a vehicle which has an internal combustion engine such as a diesel engine and a gasoline engine as a power source; an electric vehicle which has an electric motor as the power source; a hybrid vehicle including both the internal combustion engine and the electric motor; or the like. The above-described electric vehicle is driven by using electric power which is discharged from a battery such as, for example, a secondary battery, a hydrogen fuel cell, a metallic fuel cell, and an alcohol fuel cell.

<Subject Vehicle M>

As illustrated in FIG. 1, the subject vehicle M includes: sensors including a finder 20, a radar 30, and a camera 40; a navigation device 50; and the vehicle controller 100.

The finder 20 is, for example, a LIDAR (Light Detection and Ranging or Laser Imaging Detection and Ranging) which measures a distance to a target by illuminating the target with light and then measures the reflected scattered light. For example, two units of the finders 20 are disposed right and left spaced apart from each other in a front part of the subject vehicle M, and three units of the finders 20 are disposed in a rear side thereof (that is, five units in the front and the rear parts in total).

For example, three units of the radars 30 are disposed right in the front part of the subject vehicle M, and two units of the radars 30 are disposed in the rear side thereof (totaling five units in the front and the rear parts). The radar 30 detects an object by, for example, a FM-CW (Frequency Modulated Continuous Wave) method.

The camera 40 is, for example, a digital camera which uses a solid-state image sensing device such as a CCD (Charge Coupled Device) and a CMOS (Complementary Metal Oxide Semiconductor). The camera 40 is attached to an upper side of a front windshield, a rear surface of a rearview mirror, or the like. The camera 40 captures, for example, an image of an area in front of the subject vehicle M itself periodically and repeatedly. In the example of FIG. 1, two monocular cameras are illustrated as the cameras 40. The camera 40 may be, however, a stereo camera.

The configuration illustrated in FIG. 1 is given for illustrative purpose only, and part of the configuration may be omitted, or another configuration may be added thereto.

<Vehicle Controller 100>

Figure 2:
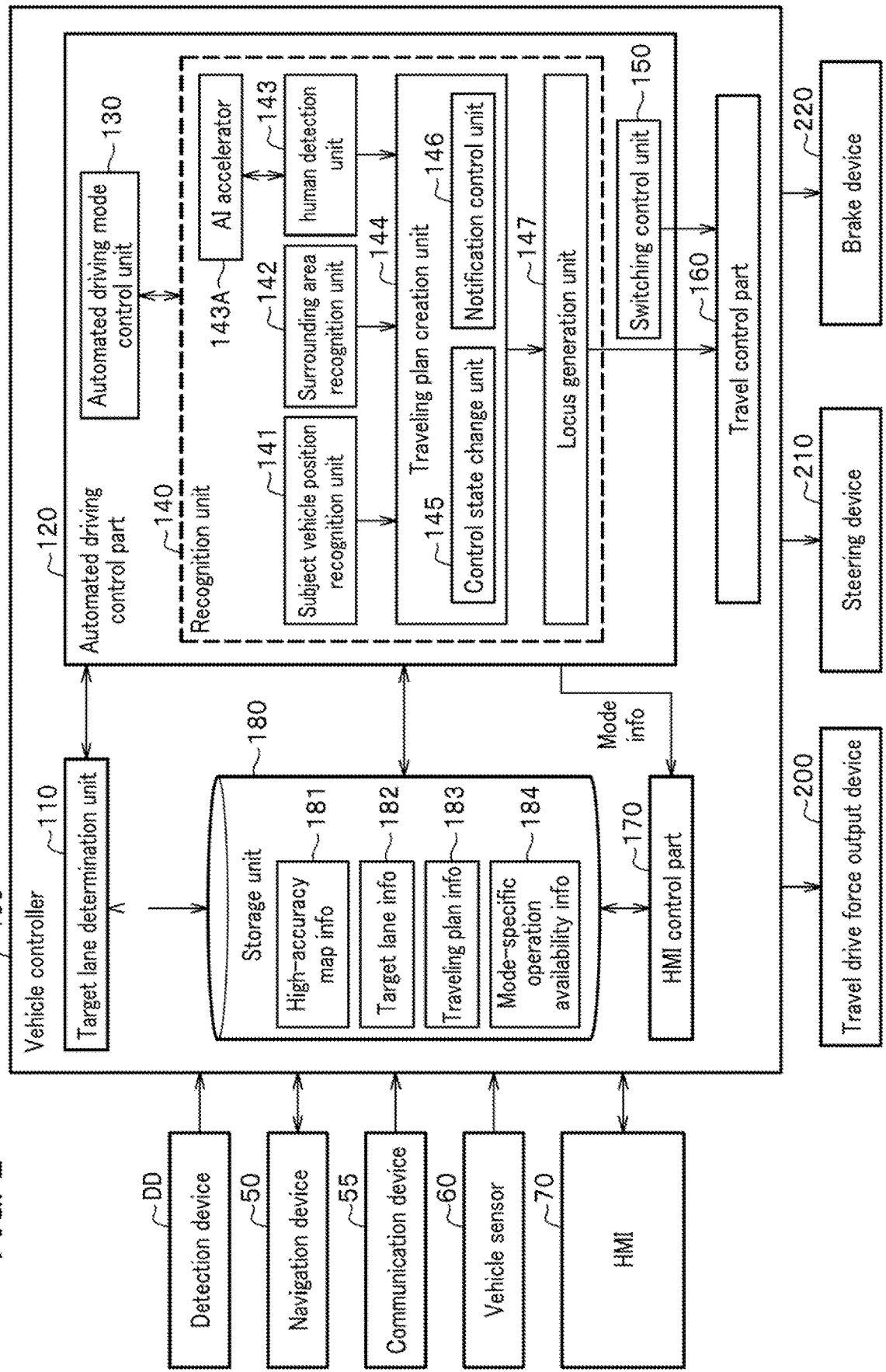
FIG. 2 is a functional configuration diagram focusing on the vehicle controller according to the embodiment.

FIG. 2 is a functional configuration diagram focusing on the vehicle controller 100 according to this embodiment. The subject vehicle M includes: a detection device DD including the finder 20, the radar 30, and the camera 40; the navigation device 50; a communication device 55; a vehicle sensor 60; a human machine interface (HMI) 70; the vehicle controller 100; a travel drive force output device 200; a steering device 210; and a brake device 220; Those devices and apparatuses are connected to each other through a multiplex communication line such as a CAN (Controller Area Network) communication line, a serial communication line, a radio communication network, or the like. Note that a vehicle controller may be referred to as not only the "vehicle controller 100" alone but also a combination of the vehicle controller 100 and other components (such as the detection device DD, a HMI 70, or the like).

<Navigation Device 50>

The navigation device 50 includes a GNSS (Global Navigation Satellite System) receiver, map information (a navigation map), a touch panel type display device which functions as a user interface, a speaker, a microphone, or the like. The navigation device 50 specifies a position of the subject vehicle M by the GNSS receiver and gives a route from the position to a destination designated by a user. A target lane determination part 110 (to be described hereinafter) of the vehicle controller 100 is provided with the route given by the navigation device 50. The position of the subject vehicle M may be specified or supplemented by an INS (Inertial Navigation System) which uses an output of the vehicle sensor 60. Also, when the vehicle controller 100 performs a manual driving mode, the navigation device 50 gives guidance on the route to the destination by voice, sound, or navigation display.

Note that a configuration for specifying a position of the subject vehicle M may be provided separately from the navigation device 50. The navigation device 50 may be realized, for example, by a function of a terminal device such as a smart phone and a tablet terminal carried by a user.

In this case, information is transmitted and received between the terminal device and the vehicle controller 100 by radio communication or wired communication.

<Communication Device 55>

The communication device 55 performs radio communication using, for example, a cellular network, a Wi-Fi network, Bluetooth (registered trademark), DSRC (Dedicated Short Range Communication), or the like. The communication device 55 performs, for example, radio communication with an information providing server of a system which monitors a traffic situation of a road, such as VICS (Vehicle Information and Communication System) (registered trademark)) and acquires information (hereinafter, referred to as "traffic information") indicating a traffic situation of a road on which the subject vehicle M is traveling or is going to travel. The traffic information includes such information as information on traffic jam ahead, a time required for passing through a traffic jam area, information on accident, a disabled car, and a construction work, information on speed control and lane control, information on location of parking lot and on whether or not a parking lot, a highway travel center, or a rest stop is full. The communication device 55 may acquire the traffic information by performing communication with a radio beacon provided in a side strip of a road or by performing vehicle-to-vehicle communication with another vehicle which is traveling near the subject vehicle M. The communication device 55 is an example of an "acquisition unit" which acquires information on traffic jam.

<Vehicle Sensor 60>

The vehicle sensor 60 includes a vehicle speed sensor that determines a vehicle speed of the subject vehicle M, an acceleration sensor that detects acceleration thereof, a yaw rate sensor that determines an angular velocity about a vertical axis thereof, and an orientation sensor that determines in which direction the subject vehicle M is traveling.

<HMI 70>

Figure 3:
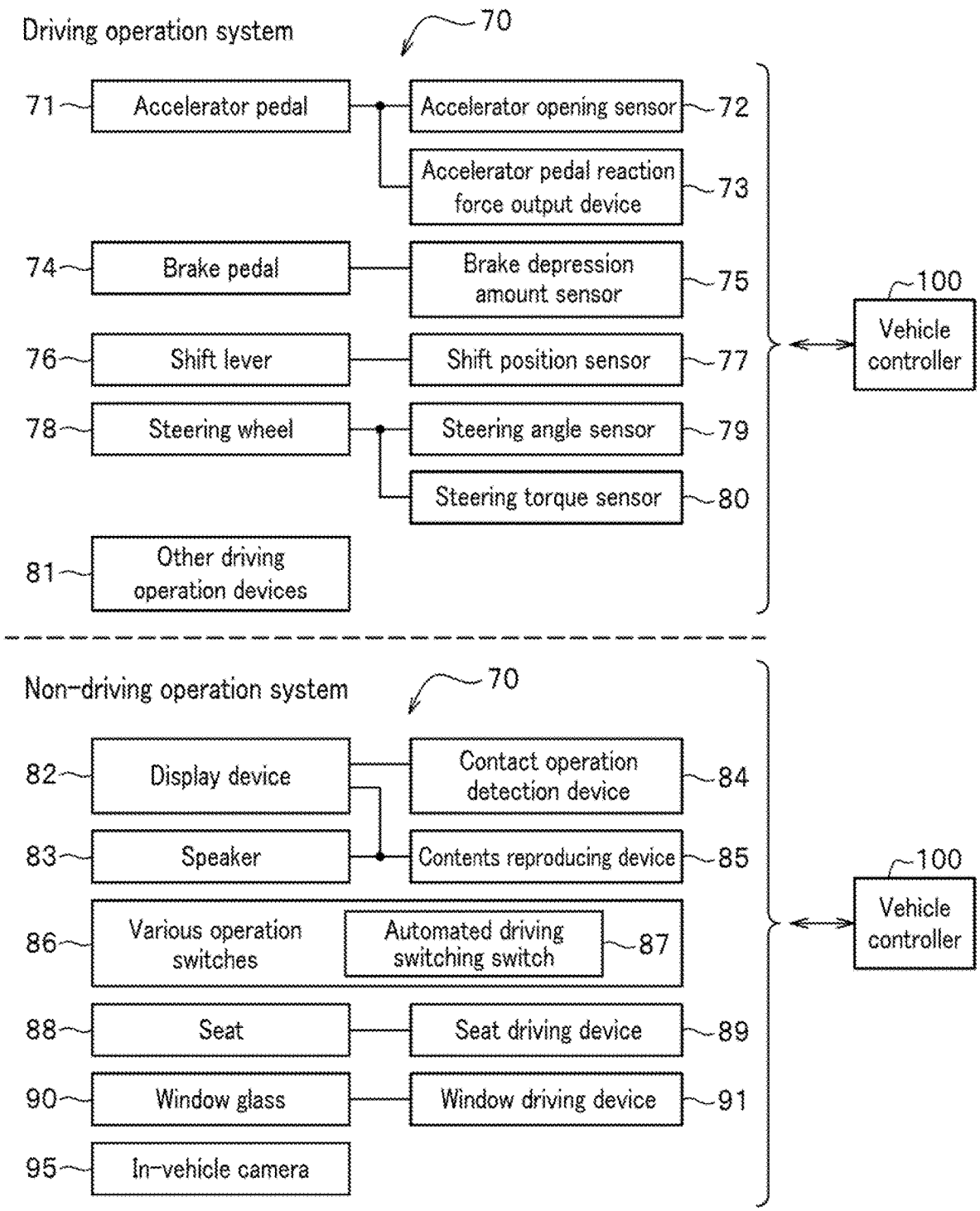
FIG. 3 is a configuration diagram illustrating a HMI of the vehicle controller according to the embodiment.

FIG. 3 is a configuration diagram illustrating the HMI 70.

As illustrated in FIG. 3, the HMI 70 includes: a configuration of a driving operation system; and a configuration of a non-driving operation system. A boundary therebetween is not specifically defined, and the configuration of the driving operation system may include a function of the non-driving operation system (or vice versa). The navigation device 50 and the HMI 70 are each an example of an "output unit".

The HMI 70 includes, as components of the driving operation system, an accelerator pedal 71, an accelerator opening sensor 72, an accelerator pedal reaction force output device 73, a brake pedal 74, a brake depression amount sensor (or a master pressure sensor or the like) 75, a shift lever 76, a shift position sensor 77, a steering wheel 78, a steering angle sensor 79, a steering torque sensor 80, and other driving operation devices 81.

The accelerator pedal 71 is an operator which allows input of an acceleration instruction (or a deceleration instruction by a return operation) by a vehicle occupant. The accelerator opening sensor 72 detects a depression amount of the accelerator pedal 71 and outputs an accelerator opening signal indicating the depression amount to the vehicle controller 100.

The accelerator pedal 71 may directly output an accelerator opening signal to, instead of the vehicle controller 100, the travel drive force output device 200, the steering device 210, or the brake device 220. The same is applied to configurations of other driving operation systems to be described hereinafter. The accelerator pedal reaction force output device 73 outputs, for example, a force (an operation reaction force) in a direction opposite to an operation direction with respect to the accelerator pedal 71 in response to an instruction from the vehicle controller 100.

The brake pedal 74 is an operator which allows input of an instruction of deceleration by a vehicle occupant. The brake depression amount sensor 75 detects a depression amount (or a depression force) of the brake pedal 74 and outputs a brake signal indicating the detected result to the vehicle controller 100.

The shift lever 76 is an operator that allows input of an instruction of changing a shift stage by the vehicle occupant. The shift position sensor 77 detects a shift stage instructed by the vehicle occupant and outputs a shift position signal indicating the detected result to the vehicle controller 100.

The steering wheel 78 is an operator that allows input of an instruction of turning, by the vehicle occupant. The steering angle sensor 79 detects an operation angle of the steering wheel 78 and outputs a steering angle signal indicating the detected result to the vehicle controller 100. The steering torque sensor 80 detects the torque applied to the steering wheel 78 and outputs a steering torque signal indicating the detected result to the vehicle controller 100.

Examples of the other driving operation devices 81 include a joystick, a button, a dial switch, and a GUI (Graphical User Interface) switch. The other driving operation devices 81 allow input of an instruction of acceleration, of deceleration, of turning, or the like and output the instruction to the vehicle controller 100.

The HMI 70 includes, as the configuration of the non-driving operation system, for example, a display device 82, a speaker 83, a contact operation detection device 84, a content reproducing device 85, various operation switches 86, a seat 88, a seat driving device 89, a window glass 90, and a window driving device 91.

Examples of the display device 82 include, for example, a LCD (Liquid Crystal Display), an organic EL (Electroluminescence) display, or the like, each of which is attached to various portions of an instrument panel or any portion which faces a front passenger seat or a rear seat, or the like. The display device 82 may be a HUD (Head-Up Display) which projects an image onto a front windshield or other window. The speaker 83 outputs voice. In a case where the display device 82 is a touch panel, the contact operation detection device 84 detects a contacted location (a touched location) on a display screen of the display device 82 and outputs the contacted location to the vehicle controller 100. In a case where the display device 82 is not a touch panel, however, the contact operation detection device 84 may be omitted.

The content reproducing device 85 includes, for example, a DVD (Digital Versatile Disc) reproducing device, a CD (Compact Disc) reproducing device, a television receiver, a device generating various guidance images, or the like. A part or all of the display device 82, the speaker 83, the contact operation detection device 84, and the content reproducing device 85 may each have a configuration common to that of the navigation device 50.

The various operation switches 86 are disposed at any positions in the subject vehicle M. The various operation switches 86 include an automated driving switching switch 87 which gives an instruction of a start (or a start after an elapse of a prescribed time) and an end of automated driving. The automated driving switching switch 87 may be a GUI (Graphical User Interface) switch or a mechanical switch. The various operation switches 86 may include a switch which drives the seat driving device 89 or the window driving device 91.

The seat 88 is a seat on which a vehicle occupant sits. The seat driving device 89 freely drives a reclining angle, a position in a front-back direction, a yaw angle, or the like of the seat 88. The window glass 90 is disposed in, for example, respective doors. The window driving device 91 drives an opening and a closing operation of the window glass 90.

The in-vehicle camera 95 is a digital camera making use of the CCD, the CMOS, or the like. The in-vehicle camera 95 is attached to a position at which an image of at least a head of a vehicle occupant who performs a driving operation can be captured. Some examples of the position include a rearview mirror, a steering boss portion, and an instrument panel. The camera 40 captures, for example, an image of the vehicle occupant periodically and repeatedly.

Referring back to FIG. 2, the vehicle controller 100 is realized by, for example, one or more processors or hardware having a function equivalent thereto. The vehicle controller 100 may have a configuration in which: an ECU (Electronic Control Unit) in which a processor such as a CPU (Central Processing Unit), a storage device, and a communication interface are connected to each other by an internal bus; or a MPU (Micro-Processing Unit), or the like are combined with each other.

The vehicle controller 100 includes the target lane determination part 110, an automated driving control part 120 (which may also be referred to as an driving control unit), an automated driving mode control unit 130, a recognition unit 140, a switching control unit 150, a travel control part 160, a HMI control part 170, and a storage part 180. For example, the automated driving control part 120 includes a surrounding area recognition unit 142, a traveling plan creation unit 144, a locus generation unit 147, and a future state prediction unit 152. A combination of the automated driving mode control unit 130, the traveling plan creation unit 144, the locus generation unit 147, and the switching control unit 150 is an example of a "control unit".

A part or all of the target lane determination part 110, the respective units of the automated driving control part 120, and the travel control part 160 are realized when a processor executes a program (software). Part or all of those components may be realized by hardware such as a LSI (Large Scale Integration) and an ASIC (Application Specific Integrated Circuit) or may be realized by a combination of software and hardware.

It is assumed in explanation below that the automated driving control part 120 executes functions of the respective units (to be described in detail hereinafter) by reading an appropriate program as needed from a ROM-EEPROM (Electrically Erasable Programmable Read-Only Memory) and loading the read program in a RAM. The program may be previously stored in the storage part 180 or may be loaded via other storage medium or communication medium as needed.

<Target Lane Determination Part 110>

The target lane determination part 110 is realized by, for example, a MPU (Micro Processing Unit). The target lane determination part 110 divides a route provided by the navigation device 50, into a plurality of blocks (for example, divides the route for every 100 meters in a vehicle traveling direction) and determines a target lane for each of the blocks by referencing high-accuracy map information 181. For example, in a case where there is a road fork, a junction, or the like on the route, the target lane determination part 110 determines an appropriate target lane such that the subject vehicle M can travel on a reasonable travel route to travel through, for example, a road fork to a destination. The target lane determined by the target lane determination part 110 is stored in the storage part 180 as target lane information 182.

<Automated Driving Control Part 120>

The automated driving control part 120 includes the automated driving mode control unit 130, the recognition unit 140, and the switching control unit 150.

<Automated Driving Mode Control Unit 130>

The automated driving mode control unit 130 determines a mode of automated driving to be performed by the automated driving control part 120. The mode of the automated driving in this embodiment includes modes to be described below. Note that the following description is illustrative only, and any number of modes of automated driving may be determined. A name of a level in the mode of automated driving is given also as an example.

Control of automated driving of the subject vehicle M is performed under, for example, modes as follows: a first driving status (which may also be referred to as a "first support status"); a second driving status (which may also be referred to as the "first support status"); and a third driving status (which may also be referred to as a "second support status").

A burden which a driver bears at the third driving status is lower than that at the second driving status. In other words, an automated degree at the third driving status is higher than that at the second driving status. A burden which a driver bears at the second driving status is lower than that at the first driving status. In other words, an automated degree at the second driving status is higher than that at the first driving status.

For example, a driver needs to hold a steering handle at the first driving status. Meanwhile, the driver does not need to hold the steering handle at the second driving status.

<Third driving status> The third driving status is a system-driven driving and it is necessary for a driver to monitor the system. When a driving at the third driving status is performed, automated driving is automatically conducted only in a limited scene (monitoring the system is still required).

An example of a travel state selected in the third driving status is a traffic jam following mode (a low speed following mode; traffic jam pilot (TJP)), when a traffic jam occurs. In the traffic jam following mode, a safe automated driving can be realized by following a preceding vehicle on a congested expressway. The traffic jam following mode is released when, for example, a travel speed of the subject vehicle M becomes equal to or higher than a predetermined speed (for example, 60 km/h or over). There is another case in which the third driving status is switched to another travel state at a timing of terminating the traffic jam following mode. Switching to other selectable travel mode may also be performed, however, while keeping the third driving status (see "outline of shift of control statuses" illustrated in FIG. 5 to be described hereinafter).

Note that at the third driving status, a driver monitoring camera (not illustrated) is activated and the system determines whether or not a driver is taking a look back or the like, or whether or not the driver is ready for a shift of the driving status (whether or not the driver is asleep or in a faint).

<Second driving status> The second driving status is a mode of which automated degree is high next to the third driving status. When the subject vehicle M travels at the second driving status, overall control thereon is in principal performed automatically. Depending on a situation, however, a vehicle occupant is required to drive the subject vehicle M.

An example of the control described above is that, because it is assumed that automated driving at the second driving status is performed only in a through lane, driving assistance while traveling at the second driving status is provided as long as the subject vehicle M is traveling on a through lane. Thus, automated driving in the second driving status is not provided when the subject vehicle M is traveling at a road fork, a junction, or a tollgate on a through lane or is traveling on a through lane of a two-lane road.

The second driving status thus requires an increased duty of monitoring surroundings, compared to the third driving status in which a vehicle occupant of the subject vehicle M is required to only monitor surroundings or a state thereof.

<First driving status> The first driving status is a mode of which automated degree is high next to the second driving status. When the first driving status is performed, it is necessary for the vehicle occupant to hold a steering handle any time, which is different from a simple confirmation operation depending a situation. The vehicle occupant is required to constantly monitor the surroundings and a state of the subject vehicle M.

In the first driving status or the second driving status, an automatic lane change is conducted when, for example, a vehicle occupant is notified of a timing lane change and then performs an operation of instructing the HMI 70 to change lanes.

<Automated Driving Mode Control Unit 130>

The automated driving mode control unit 130 determines the mode of automated driving based on an operation performed by the vehicle occupant via the HMI 70, an event determined by the traveling plan creation unit 144, a travel aspect determined by the locus generation unit 147, or the like. The HMI control part 170 is notified of the mode of the automated driving. A limit depending on performance of the determination device DD of the subject vehicle M or the like may be set to the mode of the automated driving. For example, when the determination device DD is low in performance, automated driving at the third driving status may not be set to be performed.

In any of the automated driving modes, switching to a manual driving mode (an overriding) is possible by operating one or more components of the driving operation system in the HMI 70. The overriding is started, for example: when a vehicle occupant of the subject vehicle M operates the driving operation system of the HMI 70 for a predetermined period of time or longer; when a variation in an amount associated with an operation becomes equal to or larger than a predetermined value (for example, an accelerator opening of the accelerator pedal 71, a brake depression amount of the brake pedal 74, a steering angle of the steering wheel 78); or when the operation of the driving operation system is performed a predetermined number of times or more.

<Recognition Unit 140>

The recognition unit 140 includes a subject vehicle position recognition unit 141, a surrounding area recognition unit 142 (which may also be referred to as a recognition unit), a human detection unit 143 (a detection unit), an AI (Artificial Intelligence) accelerator 143A (a detection unit), a traveling plan creation unit 144, and a locus generation unit 147.

<Subject Vehicle Position Recognition Unit 141>

The subject vehicle position recognition unit 141 recognizes a lane (a travel lane) in which the subject vehicle M is traveling, and a relative position of the subject vehicle M with respect to the travel lane, based on the high-accuracy map information 181 stored in the storage part 180 and on information inputted from the finder 20, the radar 30, the camera 40, the navigation device 50, or the vehicle sensor 60.

The subject vehicle position recognition unit 141 recognizes a travel lane by comparing a pattern of a road partition line (for example, arrangement of a solid line and a broken line) recognized from the high-accuracy map information 181, and a pattern of a load partition line near the subject vehicle M by an image captured from the camera 40. In the recognition, a position of the subject vehicle M acquired from the navigation device 50, or a processing result by the INS may be taken into account.

Figure 4:
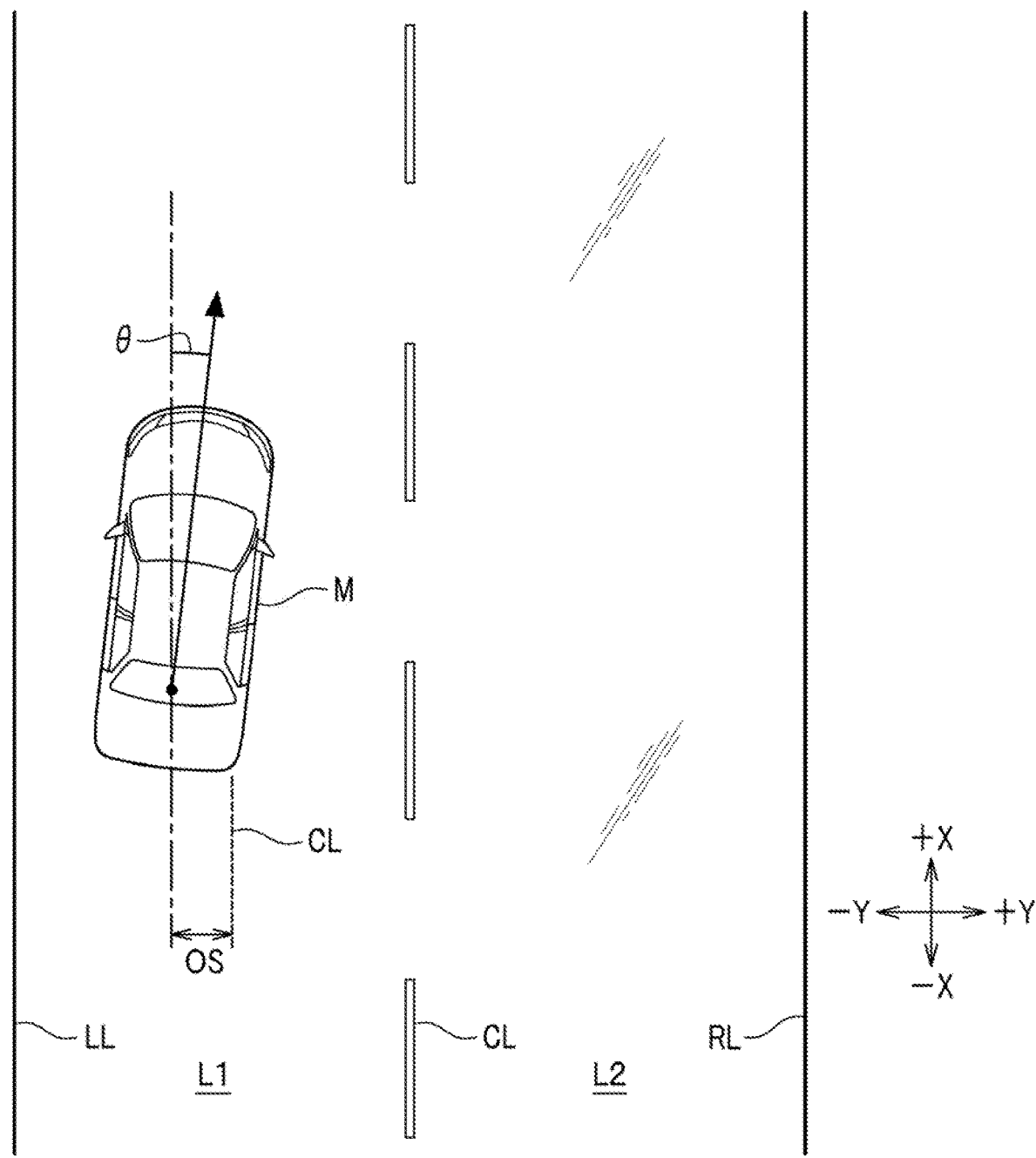
FIG. 4 is a diagram illustrating a state in which the subject vehicle position recognition unit of the vehicle controller recognizes a relative position of the subject vehicle with respect to a travel lane, according to the embodiment.

FIG. 4 is a diagram illustrating a state in which the subject vehicle position recognition unit 141 recognizes a relative position of the subject vehicle M with respect to a travel lane. In FIG. 4: a first lane L1 is a travel lane defined by a lane marking LL and a lane marking CL; a second lane L2 is a travel lane defined by the lane marking CL and a lane marking RL, both of which are the lanes in which a vehicle travels in a direction +X. The lanes L1 and L2 are adjacent to each other for vehicles travelling in the same direction. There is a road shoulder on the left side of the first lane L1.

As illustrated in FIG. 4, the subject vehicle position recognition unit 141 recognizes, for example: a deviation OS of a reference point (for example, a center of gravity) of the subject vehicle M from a centerline of a travel lane ML in which the subject vehicle M is traveling; and an angle θ made by a traveling direction of the subject vehicle M and the centerline of the travel lane ML, each as a relative position of the subject vehicle M with respect to the travel lane L1. Alternatively, the subject vehicle position recognition unit 141 may recognize a position of the reference point of the subject vehicle M with respect to any of side edges of the travel lane L1 in which the subject vehicle M is traveling, as a relative position of the subject vehicle M with respect to the travel lane L1. The target lane determination part 110 is provided with the relative position of the subject vehicle M recognized by the subject vehicle position recognition unit 141.

<Surrounding Area Recognition Unit 142>

Referring back to FIG. 2, the surrounding area recognition unit 142 recognizes a state such as a position, a speed, and an acceleration of a surrounding vehicle based on information inputted from the finder 20, the radar 30, the camera 40, or the like. The surrounding vehicle herein means a vehicle which is traveling in a vicinity of the subject vehicle M in a direction same as that of the subject vehicle M. The position of the surrounding vehicle may be indicated as a representative point such as the center of gravity and a corner of other vehicle or may be indicated by a zone represented by a contour of other vehicle. The term "state" of the surrounding vehicle may include acceleration of the surrounding vehicle, and whether or not the surrounding vehicle is changing a lane (or whether or not the surrounding vehicle intends to change lanes). The state can be obtained based on information acquired from the above-described various components. The surrounding area recognition unit 142 may recognize, in addition to the surrounding vehicle, positions of a guard rail, an electric pole, a parked vehicle, a pedestrian, or any other objects.

<Human Detection Unit 143>

The human detection unit 143 detects a human from an image taken by the camera 40. More specifically, the human detection unit 143 detects a specific target object (such as a human and a bicycle) in a specific area, using the AI accelerator 143A. The human detection unit 143 issues a request for detection of a human from the AI accelerator 143A. The AI accelerator 143A performs AI computation at somewhere other than a CPU and transmits a result of the detection of a human to the human detection unit 143. The AI accelerator 143A is used in detecting a human, because a high-speed detection is required. The detection may be, however, conducted without using the AI accelerator 143A.

For purpose of illustration, the human detection unit 143 is described separately and independently from the camera 40 and the surrounding area recognition unit 142. The human detection unit 143 may be, however, any component that can detect a specific target object such as: an image processing unit that extracts a human or the like from an image taken by the camera 40; and a unit that recognizes and detects a human or the like from a contour of an image in an internal processing performed by the surrounding area recognition unit 142. In this case, the human detection unit 143 is omitted from the recognition unit 140.

As to be described hereinafter, a rate of recognizing a human detected by the area specification unit 143 can be increased by using VICS information obtained by the communication device 55.

<AI Accelerator 143A>

The AI accelerator 143A is a processor dedicated to detection of a human and uses a computation resource other than a CPU. The AI accelerator 143A is used in, for example, an image processing by a GPU (Graphics Processing Unit) accelerated processor and a signal processing using FPGA (Field Programmable Gate Array). The AI accelerator 143A performs AI computation on dedicated hardware (for example, GPU).

<Traveling Plan Creation Unit 144>

The traveling plan creation unit 144 sets a start point of an automated driving, and/or a destination thereof. The start point of the automated driving may be a current position of the subject vehicle M or may be a point at which an operation of instructing to start the automated driving is conducted. The traveling plan creation unit 144 creates a traveling plan to be used in a section between the start point and the destination of the automated driving, though not being limited to this. The traveling plan creation unit 144 may create a traveling plan to be used in any section.

The traveling plan includes, for example, a plurality of events (see operation functions performable in automated driving in FIG. 6 to be described hereinafter) which are sequentially executed. Some examples of the events include: a deceleration event of decelerating the subject vehicle M; an acceleration event of accelerating the subject vehicle M; a lane keeping event of making the subject vehicle M travel without deviating from a travel lane; a lane change event of making the subject vehicle M change a travel lane thereof; an overtake event of making the subject vehicle M overtake a vehicle ahead thereof; a road fork event of making the subject vehicle M change a travel lane thereof to a desired lane at a fork point or making the subject vehicle M keep a present travel lane without changing; a junction event of making the subject vehicle M accelerate or decelerate at a junction at which vehicles are merged to a through lane and change a travel lane thereof; a hand-over event of making the subject vehicle M shift from a manual driving mode to an automated driving mode at a start point of an Automated driving or shift from the automated driving mode to the manual driving mode at a target end point of the automated driving; or the like.

The traveling plan creation unit 144 sets the lane change event, the fork event, or the junction event at a point at which a target lane determined by the target lane determination part 110 is switched. Information indicating a traveling plan created by the traveling plan creation unit 144 is stored in the storage part 180 as traveling plan information 183.

The traveling plan creation unit 144 includes a control state change unit 145 and a notification control unit 146.

<Control State Change Unit 145>

The control state change unit 145 makes the subject vehicle M operate at least at one of the following two statuses: at the first driving status or at the third driving status; and at the third driving status. Each of the first driving status and the second driving status herein refers to a driving state in which at least a task of monitoring surroundings is imposed on a driver. The third driving status herein refers to a driving state in which a task imposed on the driver is reduced, compared to that at the second driving status (that is, an automated degree at the third driving status is higher than that at the second driving status). The first driving status is, for example, a low-level automated driving and requires that a driver carries out a task of taking the steering wheel 78 (see FIG. 3) where necessary. The second driving status is an automated driving at a level higher than the first driving status and does not require that a driver carries out a task of taking the steering wheel 78.

Note that, if the first driving status is conducted in a state in which a driver manually drives a vehicle or in which ADAS (Advanced Driver Assistance System) is working, the second driving status may be conducted in a state in which an automated driving is performed. The ADAS is a driving support system of which representative examples include the ACC (Adaptive Cruise Control System) and LKAS (Lane Keeping Assist System).

In this embodiment, the control state change unit 145 provides control on a vehicle as described below. Actually, however, the control state change unit 145 is a function part of the automated driving control part 120, and thus, an operation performed by the control state change unit 145 can be taken as an operation performed by the automated driving control part 120.

The control state change unit 145 makes the subject vehicle M operate at at least one of the following two statuses: the first driving status; and the second driving status in which an automated degree is higher or in which a task imposed on the driver is less than that at the first driving status. When the subject vehicle M is traveling at the first driving status and the human detection unit 143 has detected a specific target object, then the control state change unit 145 makes the subject vehicle M continue operating at the first driving status. When the subject vehicle M is traveling at the second driving status and the human detection unit 143 has detected a specific target object, then the control state change unit 145 shifts the driving status of the subject to the first driving status.

When the subject vehicle M is traveling at the second driving status, the control state change unit 145 changes a timing of a shift to the first driving status or a remaining time before the driving status is shifted to the first driving status (see "change of remaining time before shift" in FIG. 14 to be described hereinafter), based on a relative distance between the detected specific target object and the subject vehicle M (that is, whether or not collision avoidance is necessary in a lane in which the subject vehicle M is traveling).

When the subject vehicle M is traveling at the third driving status, the control state change unit 145 changes the driving status thereof to the first driving status or the second driving status (see "determination of lane" in FIG. 15 to be described above hereinafter), based on a relative distance between the detected specific target object and the subject vehicle M. For example, when the subject vehicle M is traveling at the third driving status, the control state change unit 145 changes the driving status of the the subject vehicle M as follows, based on the relative distance between the detected specific target object and the subject vehicle M: when the detected specific target object is in a lane in which the subject vehicle M is presently traveling, the driving status thereof is changed to the first driving status; and, when the detected specific target object is on a shoulder or in a lane adjacent to the lane in which the subject vehicle M is presently traveling, the driving status thereof is changed to the second driving status.

When the subject vehicle M is traveling at the second driving status, the control state change unit 145 prevents a shift from the second driving status to the third driving status, after the human detection unit 143 detects a specific target object. A reason for the prevention of the shift is explained as follows. One of requirements to travel at the second driving status is that the subject vehicle M is traveling in a through lane on an expressway. Because the expressway is an area into which entry of a pedestrian (to be referred to as a "human" hereinafter) or the like is restricted, if a human is detected when the subject vehicle M is traveling thereon at the second driving status, it is considered that something abnormal has happened. In that case, it can be considered that the prevention of the shift may start from a time when the subject vehicle M is traveling at the first driving status. The first driving status is, however, used also when traveling on a general road, on and around which there may be many people, thus possibly resulting in excessive prevention of the shift. A combination of a detection of a specific target object while traveling at the second driving status and a subsequent shift to the third driving status is therefore effective.

When the subject vehicle M is traveling at the third driving status, the control state change unit 145 increases a degree of recognizing a human from among specific target objects, compared to that when the subject vehicle M is traveling at the first driving status or the second driving status. The increase in a degree of recognizing a human used herein means that: a section in which an accident or a construction work as a cause of a traffic jam takes place is identified, based on information on traffic jam acquired by the communication device 55 (see FIG. 2); and a human recognized in the section is determined as a police officer, a construction work-related person, a guide concerned, or the like. This makes it possible to distinguish therefrom a pedestrian walking on a shoulder on a way to a bathroom during traffic jam (it is assumed herein that the pedestrian walking on the shoulder on the way to a bathroom behaves similarly to the police officer or the like).

The control state change unit 145 increases the degree of recognizing a human, based on the information on traffic jam acquired from the communication device 55.

When a position in which the specific target object has been detected is in a lane same as that in which the subject vehicle M is traveling and a shift is performed from the third driving status to the first driving status or the second driving status, then the control state change unit 145 provides the subject vehicle M with less driving support contents, compared to when the position in which the specific target object has been detected is in a lane other than that in which the subject vehicle M is traveling. For example, when the detected specific target object is in the same lane as that in which the subject vehicle M is traveling, the control state change unit 145 shifts the driving status thereof to the first driving status; and, when in a lane other than the lane in which the subject vehicle M is traveling, to the second driving status.

As described above, regarding the driving support contents provided at the first driving status or at the second driving status after a shift from the third driving status, the control state change unit 145 provide less driving support contents when the driving status is shifted from the third driving status to the first driving status or the second driving status after a specific target object is detected, compared to those when the driving status is shifted from the third driving status to the first driving status or the second driving status without detecting a specific target object.

Next are described details of a processing of shifting the driving status of the subject vehicle M from the third driving status to the first driving status or the second driving status and details of a prescribed condition for shifting back the driving status from the second driving status to the third driving status.

<Notification Control Unit 146>

When the control state change unit 145 shifts the driving status of the subject vehicle M to the first driving status, the notification control unit 146 notifies a driver thereof of a shift of the driving status to the first driving status. When the control state change unit 145 shifts the driving status to "manual driving" in which the automated driving is stopped, the notification control unit 146 notifies the driver of a shift to the manual driving. The notification control unit 146 makes a speaker 70 output speech information which is previously stored in the storage part 180. The speech information includes information on speech such as, for example, "The driving status is switched to an automated driving because a human has been detected".

The speech described above is given just as an example and is not limited thereto. Any other sound or speech may be used as long as a driver of the subject vehicle M can be notified of a shift of the driving status due to a detection of a human or the like. Instead of the speech, notification may be carried out by light generation, displaying, vibration, or the like.

<Locus Generation Unit 147>

When a lane keeping event is carried out, the locus generation unit 147 determines in which one of travel states the subject vehicle M travels, from among a constant speed travel, a following travel, a low-speed following travel, a deceleration travel, a curve travel, an obstacle avoiding travel, and the like. The locus generation unit 147 then generates a locus candidate based on the determined travel state.

The locus generation unit 147 evaluates the generated locus candidate from, for example, such two viewpoints as planning suitability and safety and selects a locus to be outputted to the travel control part 160. From the viewpoint of the planning suitability, such a locus is highly evaluated that has high followability to a previously created plan (for example, a traveling plan) and that is short in a total length. For example, when changing to a right side lane is desired, if a candidate locus makes the subject vehicle M once change lanes to the left and then return to an original lane, the locus is poorly evaluated. From the viewpoint of safety, for example, in each locus point, the larger a distance between the subject vehicle M and an object (a surrounding vehicle or the like) and the smaller a change in an amount of acceleration, deceleration, or a steering angle a candidate locus has, then the locus is highly evaluated.

<Switching Control Unit 150>

Referring back to FIG. 2, the switching control unit 150 switches between the automated driving mode and the manual driving mode, based on a signal inputted from the automated driving switching switch 87 (see FIG. 3), or the like. The switching control unit 150 switches the automated driving mode to the manual driving mode, based on an operation instructing acceleration, deceleration, or steering to any of the components of the driving operation system in the HMI 70. For example, the switching control unit 150 switches the automated driving mode to the manual driving mode (overriding) when a specific state continues for a reference period of time or longer. The specific state is a state in which an operation amount indicated by a signal inputted from any of the components of the driving operation system in the HMI 70 exceeds a prescribed threshold value.

After switching to the manual driving mode by overriding, in a case where an operation to the components of the driving operation system in the HMI 70 has not been detected for a predetermined period of time, the switching control unit 150 may return the manual driving mode to the automated driving mode. For example, when performing a handover control of shifting from the automated driving mode to the manual driving mode at a scheduled termination point of the automated driving, in order to notify a vehicle occupant of a handover request in advance, the switching control unit 150 outputs information on the described above to the HMI control part 170.

<Travel Control Part 160>

The travel control part 160 controls the travel drive force output device 200, the steering device 210, and the brake device 220 such that the subject vehicle M traces a locus generated by the locus generation unit 147 at a time as scheduled.

<HMI Control Part 170>

When the HMI control part 170 receives information on mode of the automated driving notified from the automated driving control part 120, the HMI control part 170: references mode-specific operation availability information 184 (see FIG. 6 to be described hereinafter); and thereby controls the HMI 70 depending on a type of an automated driving mode.

The HMI control part 170 references the mode-specific operation availability information 184 based on the mode information acquired from the automated driving control part 120 and thereby determines a device (a part or all of the navigation device 50 and the HMI 70) of which use is allowed or not allowed. The HMI control part 170 also controls whether or not an operation by a vehicle occupant to the HMI 70 or the navigation device 50 of the non-driving operation system is allowed, based on the determined result.

When, for example, a driving mode performed by the vehicle controller 100 is the manual driving mode, a vehicle occupant of the subject vehicle M operates the driving operation system (for example, the accelerator pedal 71, the brake pedal 74, the shift lever 76, and the steering wheel 78) (see FIG. 3) of the HMI 70. When a driving mode performed by the vehicle controller 100 is the first driving status, the second driving status, or the like, of the automated driving mode, the vehicle occupant has a duty of monitoring the surrounding of the subject vehicle M.

In this case, in order to prevent the vehicle occupant from being distracted due to an action other than driving (for example, an operation of the HMI 70, or the like) (driver distraction), the HMI control part 170 performs control such that an operation to a part or all of the non-driving operation systems of the HMI 70 by the vehicle occupant is not allowed. At this time, in order to make the vehicle occupant monitor the surrounding of the subject vehicle M, the HMI control part 170 may make the display device 82 display, by means of an image or the like, presence of a surrounding vehicle of the subject vehicle M or a state of the surrounding vehicle, which is recognized by the surrounding area recognition unit 142, and may also make the HMI 70 accept a confirmation operation by the vehicle occupant depending on a situation.

When the driving mode is the third driving status of the automated driving, the HMI control part 170 provides control such that restrictions on the driver distraction are eased and that an operation by the vehicle occupant to the non-driving operation system is allowed, which has not been allowed before. The HMI control part 170 makes, for example, the display device 82 display a video, the speaker 83 output voice, or the contents reproduction device 85 reproduce contents stored in a DVD or the like. Note that the contents reproduced by the contents reproduction device 85 may include various types of contents of amusement or entertainment such as a TV program, in addition to the contents in the DVD or the like. The "content reproduction operation" described above with reference to FIG. 6 may indicate an operation of the contents of amusement or entertainment.

When the third driving status shifts to the second driving status or the first driving status, that is, when the mode of the automated driving is changed to a mode in which the surrounding monitoring duty by a vehicle occupant is increased, the HMI control part 170 makes the navigation device 50 or the HMI 70 of the non-driving operation system output predetermined information, upon a notification received from the control state change unit 145 to be described later. The predetermined information includes information indicating that the surrounding monitoring duty is to increase, or information indicating that an allowable degree of an operation to the navigation device 50 or the HMI 70 of the non-driving operation system becomes lowered (the operation is restricted). Note that the predetermined information is not limited thereto and may be, for example, information indicating that a vehicle occupant is advised of preparation for a hand-over control.

As described above, the HMI control part 170 notifies a vehicle occupant that the vehicle occupant owes a duty of monitoring the surrounding of the subject vehicle M at an appropriate timing by, for example, issuing an alarm or the like to the vehicle occupant at, for example, a predetermined time before the driving mode shifts from the third driving status to the second driving status or the first driving status, or before a speed of the subject vehicle M reaches a predetermined speed. As a result, it is possible to provide the vehicle occupant with a time for preparing for switching of the automated driving.

<Storage Unit 180>

The storage part 180 stores therein information such as, for example, the high-accuracy map information 181, the target lane information 182, the traveling plan information 183, and the mode-specific operation availability information 184. The storage part 180 is realized by a ROM (Read Only Memory), a RAM (Random Access Memory), a HDD (Hard Disk Drive), a flash memory, or the like. The program executed by a processor may be stored in the storage part 180 in advance or may be downloaded from an external device via an in-vehicle Internet equipment or the like. The program may be installed in the storage part 180 by mounting a portable storage medium storing the program in a drive device (not illustrated).

The high-accuracy map information 181 is map information with higher accuracy than that of a navigation map included in the navigation device 50. The high-accuracy map information 181 includes, for example, information on a center of a lane and on a boundary of a lane, or the like. The information on the boundary includes: a type, a color, and a length of a lane marker; widths of a road and a shoulder; widths of a through lane and other lanes; a position of the boundary, a type of the boundary (a guardrail, a planted strip, a roadside edge, or the like), and a zebra crossing.

The high-accuracy map information 181 may also include road information, traffic control information, address information (addresses or postal codes), facility information, telephone number information, or the like. The road information includes: information indicating a type of a road such as an expressway, a toll road, a national road, and a prefectural road; the number of lanes of the road; a width of each lane; a gradient of the road; a position of the road (three-dimensional coordinates including a longitude, a latitude, and an altitude); a curvature of a curve in a lane; a position of a junction and a fork in the lane; and a traffic sign installed on the road. The traffic control information includes information on a closed lane due to construction, a traffic accident, a traffic jam, or the like.

<Outline of Shift of Control Statuses>

Figure 5:
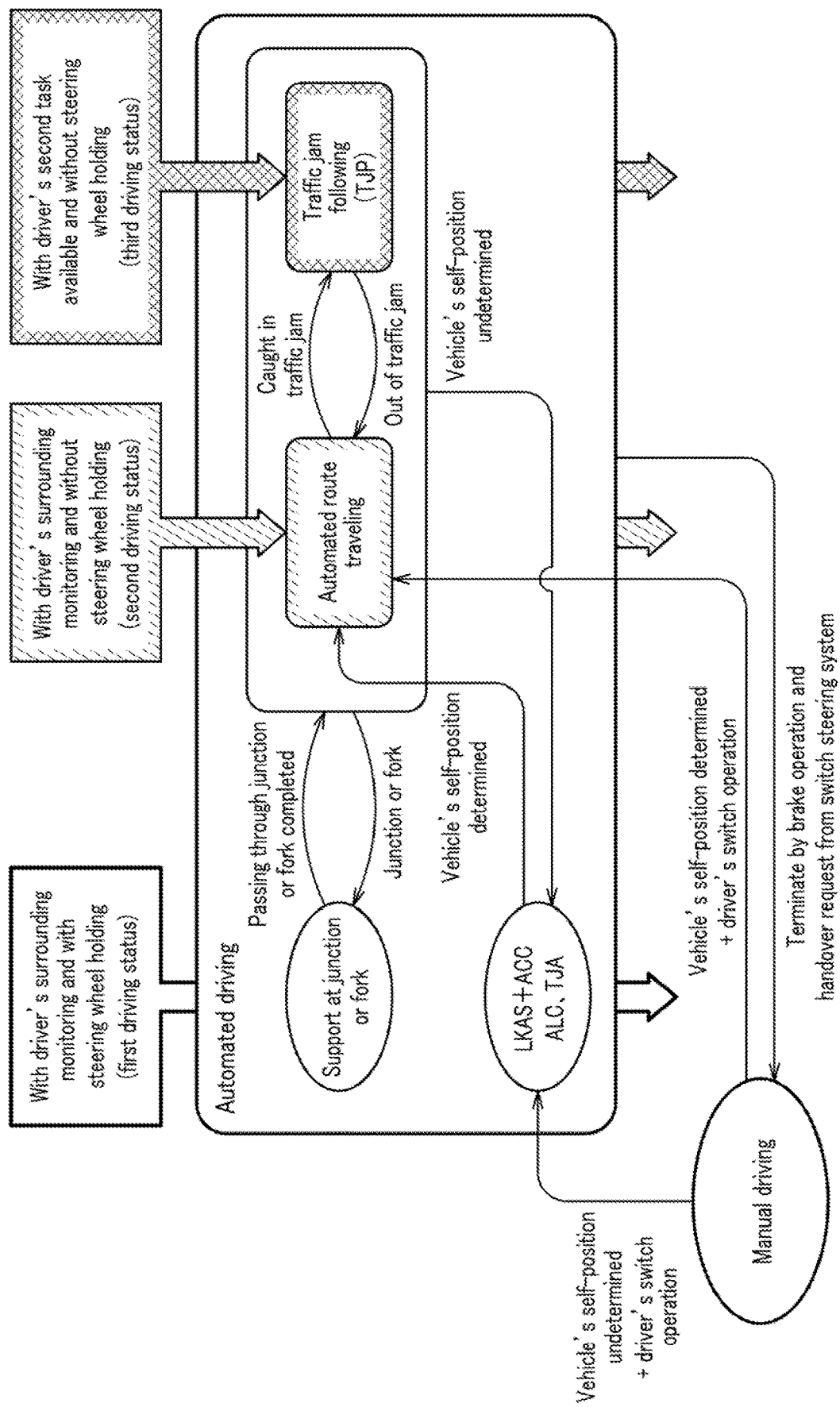
FIG. 5 is a diagram illustrating an outline of shift of control statuses in the vehicle controller according to the embodiment.

FIG. 5 is a diagram illustrating an outline of shift of control statuses.

As illustrated in FIG. 5, a vehicle equipped with the vehicle controller 100 has modes of "manual driving" and "automated driving". A shift from "manual driving" to "automated driving" is performed in response to "undetermined subject vehicle's position+driver's switch operation". A shift from "automated driving" to "manual driving" is performed in response to "terminate by brake operation and handover request from switch steering system".

"Automated driving" includes, for example: a first driving status with driver's surrounding monitoring and with steering wheel holding; a second driving status with driver's surrounding monitoring and without steering wheel holding; and a third driving status with an automated degree higher than that of the second driving status or a driving task less than that of the second driving status, with a driver's second task (see FIG. 6 to be described hereinafter) available, and without steering wheel holding.

As illustrated in FIG. 5, the first driving status includes "support at junction or fork" and "LKAS+ACC, ALC, and TJA". "Junction or fork" from the second driving status and the third driving status shifts the driving status to "support at junction or fork" of the first driving status. "Passing junction or fork" from the second driving status and the third driving status shifts the driving status to "support at junction or fork" in the first driving status. "Passing through junction or fork completed" shifts the driving status to the second driving status or the third driving status.

"LKAS+ACC, ALC, TJA" in which a vehicle's self-position is determined, while traveling at the first driving status, or "vehicle's self-position determined+driver's switch operation" in "manual driving" shifts the driving status to "automated route traveling" at the second driving status.

The first driving status automatically shifts to the second driving status. Even when a MAIN/SET button operation is inputted on an expressway, the driving status always starts at the first driving status. The manual driving status does not directly shift to the second driving status.

A shift from the first driving status is subject to determination of a self-position in a through lane on an expressway. Also, the determination of the self-position requires that the self-position is measured by means of GPS or the like and that a shape of the road detected by an autonomous sensor such as the camera 40 matches that on a high-accuracy map.

When the driving status is shiftable to the third driving status, "caught in traffic jam" in "automated route traveling" at the second driving status shifts the driving status to "traffic jam following (TJP)" at the third driving status. "Out of traffic jam" in "traffic jam following (TJP)" at the third driving status shifts the driving status to "automated route traveling" at the second driving status.

When a driver holds a steering wheel at the second driving status or at the third driving status, the driving status is not shifted. If, however, steering inputs are performed a predetermined number of times or more, the driving status is shifted to the "LKAS+ACC, ALC, and TJA" at the first driving status.

<Outline of Control State>

Figure 6:
FIG. 6 is a diagram illustrating an example of mode-specific operation availability information in the vehicle controller according to the embodiment.

FIG. 6 is a diagram illustrating an example of the mode-specific operation availability information 184.

The mode-specific operation availability information 184 illustrated in FIG. 6 includes, each as an item of the driving mode, "manual driving mode" and "automated driving mode". "Automated driving mode" includes the "first driving status", the "second driving status", the "third driving status", or the like as described above.

The mode-specific operation availability information 184 includes, each as an item of the non-driving operation system: "navigation operation" which is an operation to the navigation device 50; "content reproducing operation" which is an operation to the content reproducing device 85, "instrument panel operation" which is an operation to the display 82, or the like. In the example of the mode-specific operation availability information 188 illustrated in FIG. 6, availability of an operation performed by a vehicle occupant to the non-driving operation system is set for each of the driving modes described above. An interface device of interest is not, however, limited to the described above.

<Travel Drive Force Output Device 200, Steering Device 210, and Brake Device 220>

Referring back to FIG. 2, the vehicle controller 100 provides control on the travel drive force output device 200, the steering device 210, and the brake device 220.

<Travel Drive Force Output Device 200>

The travel drive force output device 200 outputs a travel drive force (a torque) required for a vehicle to travel, to a drive wheel. For example, when the subject vehicle M is an automobile which has an internal combustion engine as a power source, the travel drive force output device 200 includes an engine, a transmission, and an engine electronic control unit (ECU) which controls the engine. When the subject vehicle M is an electric vehicle which has an electric motor as the power source, the travel drive force output device 200 includes a travel motor and a motor ECU which controls the travel motor. When the subject vehicle M is a hybrid vehicle, the travel drive force output device 200 includes an engine, a transmission, an engine ECU, a travel motor, and a motor ECU.

When the travel drive force output device 200 includes only an engine, an engine ECU thereof adjusts a throttle opening of the engine, a shift stage, or the like in accordance with information inputted from a travel control part 160 to be described later. When the travel drive force output device 200 includes only a travel motor, a motor ECU adjusts a duty ratio of a PWM signal given to the travel motor in accordance with information inputted from the travel control part 160. When the travel drive force output device 200 includes both an engine and a travel motor, an engine ECU and a motor ECU control the travel drive force in cooperation with each other in accordance with information inputted from the travel control part 160.

<Steering Device 210>

The steering device 220, for example, includes a steering ECU and an electric motor. The electric motor changes a direction of a steering wheel by, for example, applying a force to a rack and pinion mechanism. The steering ECU drives the electric motor based on information inputted from the vehicle controller 100 or inputted information on a steering angle or a steering torque, to thereby change the direction of the steering wheel.

<Brake Device 220>

The brake device 220 includes, for example: a brake caliper; a cylinder which transmits hydraulic pressure to the brake caliper; an electric motor which generates hydraulic pressure in the cylinder; and an electric servo brake device which includes a brake control unit. The brake ECU controls the electric motor based on information inputted from the travel control part 160 such that a brake torque based on a braking operation is outputted to each wheel. The electric servo brake device may include a mechanism which transmits hydraulic pressure generated by an operation of a brake pedal, to the cylinder via a master cylinder, as a backup.

The brake device 220 is not limited to the electric servo brake device described above and may be an electronic control-type hydraulic brake device. The electronic control-type hydraulic brake device controls an actuator based on information inputted from the travel control part 160 such that hydraulic pressure of the master cylinder is transmitted to the cylinder. The brake device 220 may include a regenerative brake using a travel motor which may be included in the travel drive force output device 200.

Next are described operations of the vehicle controller 100 having the configuration as described above.

<Basic Operations of Vehicle Control Processing of Vehicle Controller 100>

Figure 7:
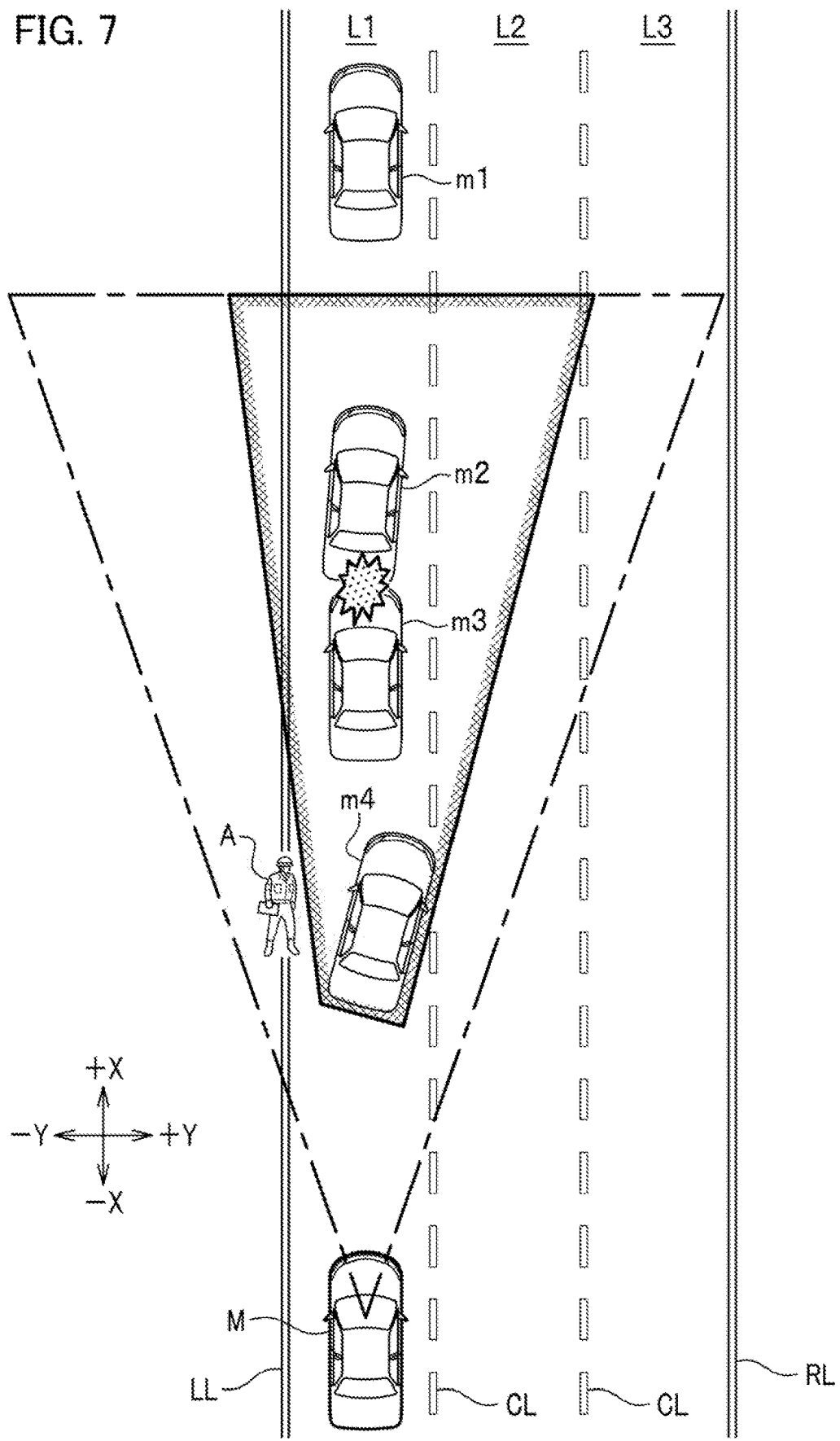
FIG. 7 is a diagram for explaining a vehicle control on a subject vehicle M during automated driving on an expressway according to the embodiment.

FIG. 7 is a diagram for explaining a vehicle control on the subject vehicle M during automated driving on an expressway. In FIG. 7: a first lane L1 is a travel lane defined by a lane marking LL and a lane marking CL; a second lane L2 is a travel lane defined by the lane marking CL and another lane marking CL; and a third lane L3 is a fast lane defined by another lane marking CL and a lane marking RL, all of which are the lanes in which a vehicle travels in a direction +X. The lanes L1 to L3 are adjacent to each other for vehicles travelling in the same direction. There is a road shoulder on the left of the first lane L1. Though not illustrated, there is an oncoming lane with respect to the lanes L1 to L3 (that is, a lane in which a vehicle travels in an −X direction). Note that, due to a difference in traffic directionality, when a shoulder is present on a right side of a lane in which the subject vehicle M travels, description below is also applicable by interchanging right and left.

In an example illustrated in FIG. 7, the subject vehicle M travels in the first lane L1. Ahead of the subject vehicle M in the first lane L1, there are other vehicles m1, m2, m3, and m4. The vehicle m2 has been rear-ended by the vehicle m3 and the vehicles m2 and m3 come to a stop at present. The vehicle m1 is a vehicle having some connection with the vehicle m2 and presently parks ahead of the vehicle m2. Upon occurrence of the rear-end accident, a person (a person in charge of accident handling, a police officer, a driver of the vehicle m3, or the like) A is standing at the leftmost of the first lane L1 beside a shoulder behind the rear-ended vehicle m2.

A portion encircled by cross-hatching in FIG. 7 represents an area of occlusion which blocks passage of the vehicle m4. The vehicle m4 intends to avoid a site of the rear-end accident and is trying to change lanes from the first lane L1 to the second lane L2.

While traveling, the subject vehicle M monitors an area indicated by a chain line in FIG. 7 by means of the camera 40 (see FIG. 1). Meanwhile, in the conventional technology, a driver of the subject vehicle M visually recognizes conditions of a rear-end accident site, and, as is done by the vehicle m4 in the example of FIG. 7, will change lanes from the first lane L1 to the second lane L2 short of the rear-end accident site. In this case, however, the driver of the subject vehicle M may not recognize the rear-end accident in the first lane L1 until the subject vehicle M considerably comes close thereto. Meanwhile, in this embodiment, the surrounding area recognition unit 142 recognizes a human present in lanes L1 to L3 and the shoulder, based on an image taken by the camera 40. When the subject vehicle M is traveling at the second driving status, the control state change unit 145 thus shifts the driving status of the subject vehicle M to the first driving status, based on the human detected by the surrounding area recognition unit 142. When the subject vehicle M is traveling at the first driving status and a human is detected as described above, the control state change unit 145 keeps the driving status of the subject vehicle M at the first driving status (prevents an automated degree of the driving status from being higher). In such an emergency situation that a human is detected in an area in which he or she is not supposed to be present, the configuration described above makes it possible to quickly shift the driving status as appropriate.

In the example of FIG. 7, a human (a person in charge of accident handling) is assumed as a specific target object in the rear-end accident in a specific area (on an expressway). If the specific area is a site of a vehicle malfunction, a construction work, a checkpoint, or the like, presence of a human is highly likely. If the specific area includes a shoulder during traffic jam, a pedestrian walking on a way to a bathroom may be present. Note that a tollgate is not deemed as a specific area and an operation herein at the second driving status as described above is not applicable. When there is a tollgate in a through line, the control state change unit 145 makes the driving status of the subject vehicle M shift to the first driving status a predetermined distance short of the tollgate.

Figure 8:
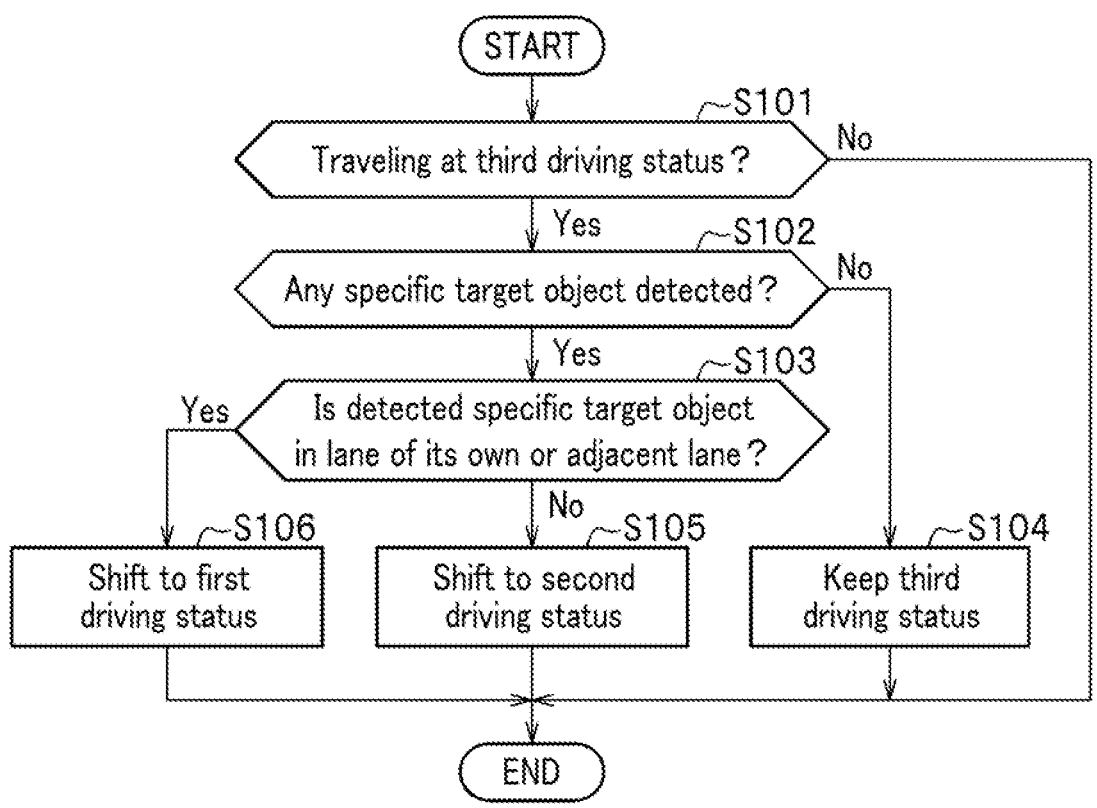
FIG. 8 is a basic flowchart illustrating a vehicle control processing performed by the vehicle controller according to the embodiment.

FIG. 8 is a basic flowchart illustrating a vehicle control processing performed by the vehicle controller 100 according to the embodiment. The automated driving control part 120 (see FIG. 2) repeatedly performs steps of the flowchart on a predetermined cycle.

In step S101, the control state change unit 145 of the automated driving control part 120 determines whether or not the subject vehicle M is traveling at the third driving status. If the subject vehicle M is determined to be traveling at the third driving status, the processing advances to step S102. If the subject vehicle M is determined to be traveling at the third driving status, the processing terminates. One of requirements to travel at the third driving status is that the subject vehicle M is presently traveling in a specific area into which entry of a specific target object (such as a pedestrian and a bicycle) is restricted. One of concrete examples of the specific area is an expressway.

In step S102, the control state change unit 145 determines whether or not any specific target object has been detected in a specific area (on an expressway). If no specific target object is determined to have been detected (step S102: No), the processing advances to step S104, in which the driving status of the subject vehicle M is kept unchanged at the third driving status and the processing terminates.

If any specific target object has been detected in the specific area (on the expressway) (step S102: Yes), that means an emergency situation because a human has been detected in an area in which he or she is not supposed to be present, a prompt shift of the driving status is required. In this case, there are two alternatives of the shift of the driving status: from the third driving status to the second driving status; and from the third driving status to the first driving status. That is, the driving status in the automated driving mode is shifted such that a surrounding monitoring duty by a vehicle occupant is increased, such as a shift from the third driving status to the second driving status or the first driving status.

There is a case in which, for example, as illustrated in FIG. 7, upon occurrence of the rear-end accident in the first lane L1 in the specific area (on the expressway), a person (a person in charge of accident handling, a police officer, a driver of the vehicle m3, or the like) A is standing at the leftmost of the first lane L1 beside a shoulder behind the rear-ended vehicle m2. In this case, the driving status in the automated driving mode is shifted such that a surrounding monitoring duty by a vehicle occupant is increased, such as a shift from the third driving status to the second driving status or the first driving status.

Figure 9:
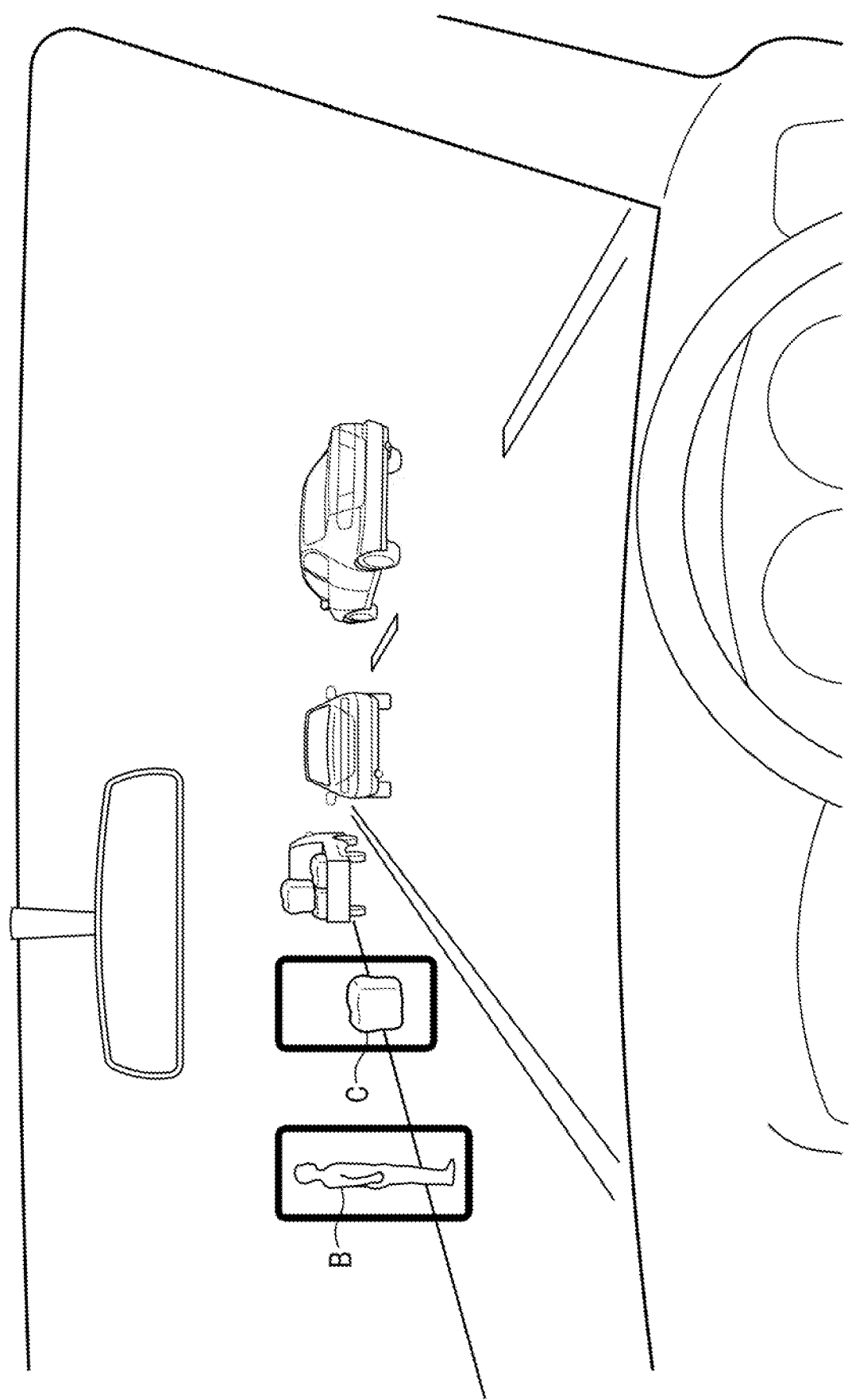
FIG. 9 is a diagram illustrating a view ahead of the subject vehicle M viewed by a driver thereof while traveling in a specific area (on an expressway) according to the embodiment.

FIG. 9 is a diagram illustrating a view ahead of the subject vehicle M viewed by a driver thereof while traveling in a specific area (on an expressway). As illustrated in FIG. 9, a truck with a load thereon stops on a left-hand shoulder in a lane same as that in which the subject vehicle M travels. There are a human B and a load C which has fallen off the truck, behind the truck. The surrounding area recognition unit 142 detects the human B and the load C (see frames in FIG. 9), based on an image taken by the camera 40 (see FIG. 1). In this case, the surrounding area recognition unit 142: detects the human B in a lane adjacent to the lane of its own in the specific area (on the expressway); thereby determines that a prompt shift of the driving status is required; and lowers a level of the automated driving from the third driving status to the first driving status.

Figure 10:
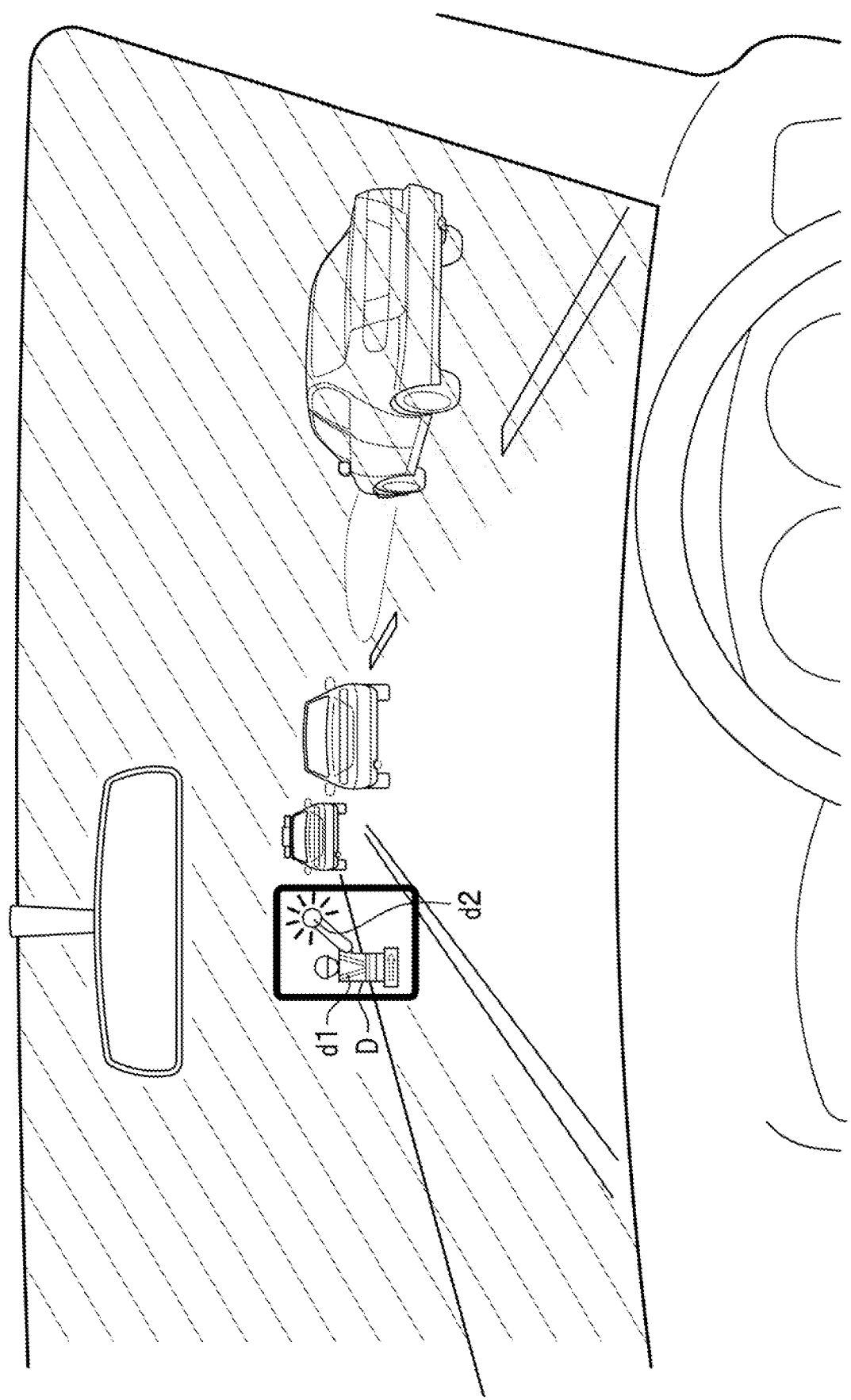
FIG. 10 is a diagram illustrating a view ahead of the subject vehicle M viewed by a driver thereof while traveling in a specific area (on an expressway) at night according to the embodiment.

FIG. 10 is a diagram illustrating a view ahead of the subject vehicle M viewed by a driver thereof while traveling in a specific area (on an expressway) at night. As illustrated in FIG. 10, upon occurrence of an accident or the like, a human mannequin D as a specific target object is placed near a shoulder. The human mannequin D wears a light-reflective vest d1 (which may also be referred to as a feature target object) and has a moving guide rod d2 (another feature target object) in its hand. Note that a human or an article representing a human (herein, the human mannequin D) is referred to as a specific target object. The light-reflective vest d1 or the guide rod d2 each of which is attached to a human or an article representing a human is referred to as a feature target object.

As the view is taken at night, the guide rod d2 emits light. The surrounding area recognition unit 142 recognizes the human mannequin D (see the frame in FIG. 10), based on an image taken by the camera 40. In this case, the human mannequin D and the guide rod d2 (the feature target object) are recognized in a lane adjacent to the lane of its own in the specific area (on the expressway), the surrounding area recognition unit 142: determines that, though the human mannequin D is not a pedestrian walking on a shoulder on a way to a bathroom during traffic jam, presence of the human mannequin D indicates that an accident or a construction work takes place; and makes the driving status of the subject vehicle M shift from the third driving status down to the first driving status.

Referring back to FIG. 8, in step S103, the control state change unit 145 determines whether the specific target object detected in the specific area (on the expressway) is in a lane in which the subject vehicle M travels or a lane adjacent to the lane of its own. Herein, a case in which the specific target object is not in the lane of its own or the adjacent lane means, for example, when a human is in an oncoming lane or on a shoulder. In the example illustrated in FIG. 7 described above, the subject vehicle M is traveling in the first lane L1 at the third driving status, and the surrounding area recognition unit 142 has detected a human A standing on or near a shoulder adjacent to the first lane.

When a specific target object is detected, the control state change unit 145 (see FIG. 2) stores an automated driving level lowering history which is a history of lowering down the driving status (see FIG. 16 to be described hereinafter), in the storage unit 180.

If the detected specific target object is not determined to be in the lane of its own or the adjacent lane (step S103: No), in step S105, the control state change unit 145: determines that, though a human has been detected in the specific area (on the expressway), the detected specific target object has no direct influence on the subject vehicle M; thereby shifts the driving status from the third driving status to the second driving status; and terminates the processing.

Figure 11:
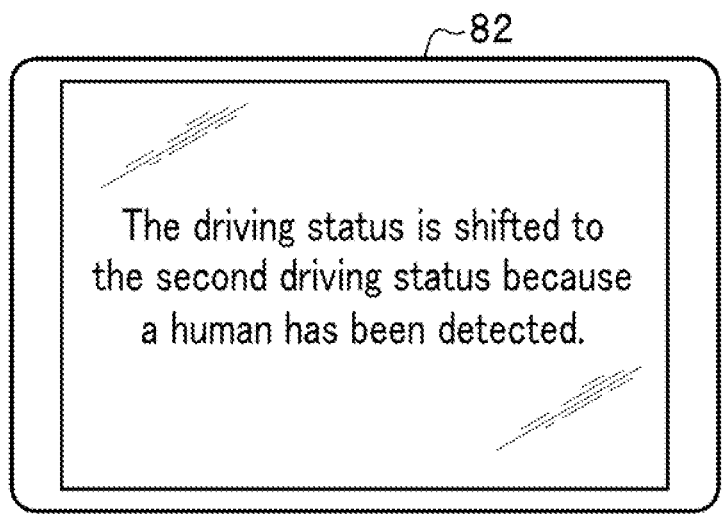
FIG. 11 is a diagram illustrating an example of shift notification information outputted by a navigation device or the HMI of the vehicle controller according to the embodiment.

FIG. 11 is a diagram illustrating an example of shift notification information outputted by the navigation device 50 or the HMI 70 according to the embodiment. As illustrated in FIG. 11, the HMI control part 170 provides control on the navigation device 50 or the HMI 70 such that a vehicle occupant of the subject vehicle M is notified that the driving status thereof is shifted from the third driving status down to the second driving status by means of an image, a speech, or the like. Herein, the navigation device 50 or the HMI 70 notifies that "the driving status is now shifted to the second driving status because a human has been detected" via an image, a speech, or the like.

Referring back to FIG. 8, in step S103 described above, if the detected specific target object is determined to have been in the lane of its own or the adjacent lane (step S103: Yes), in step S106, the control state change unit 145: shifts the driving status from the third driving status to the first driving status; and terminates the processing. For example, as in the example illustrated in FIG. 7, when the human A is standing on or near the shoulder adjacent to the first lane L1 (not entirely on the shoulder), the control state change unit 145 determines that a specific target object is in the lane of its own or the adjacent lane; and shifts the driving status from the third driving status to the first driving status. The case where the specific target object is not in the lane of its own or the adjacent lane herein includes a case, for example, the specific target object is present on a shoulder, or in a lane other than the lane of its own and the adjacent lane, or in an oncoming lane.

Figure 12:
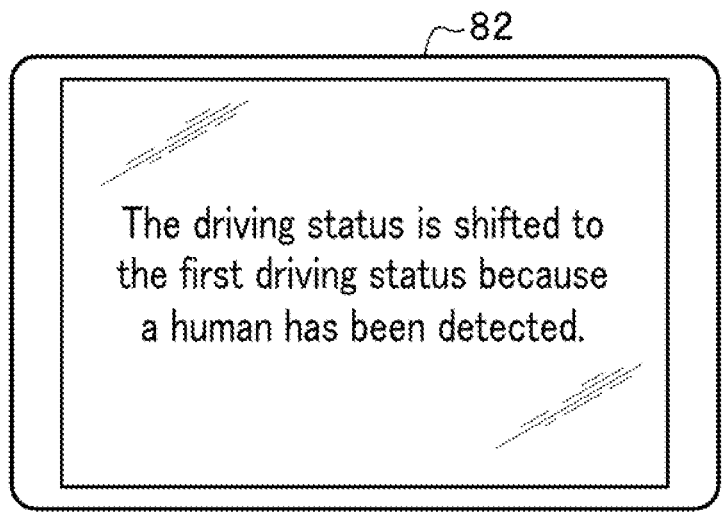
FIG. 12 is a diagram illustrating an example of automated driving stop notification information outputted by the navigation device or the HMI of the vehicle controller according to the embodiment.

FIG. 12 is a diagram illustrating an example of automated driving stop notification information outputted by the navigation device 50 or the HMI 7. As illustrated in FIG. 12, the HMI control part 170 provides control on the navigation device 50 or the HMI 70 such that a vehicle occupant of the subject vehicle M is notified that the driving status thereof shifts to the first driving status via an image, a speech, or the like. Herein, the navigation device 50 or the HMI 70 notifies that "the driving status is now shifted to the first driving status because a human has been detected" via an image, a speech, or the like.

As described above, a target area for detecting a specific target object includes the lane of its own, the adjacent lane, and the adjacent shoulder. This makes it possible to exclude such a case that there is a human in an oncoming lane, which does not have a direct influence on the subject vehicle M, and to prevent an automated driving level from lowering because of overdetection.

As explained with reference to the processing of FIG. 8, the vehicle controller 100 shifts the driving status of the subject vehicle M from the first driving status to the second driving status or from the second driving status to the first driving status, on condition that the subject vehicle M is traveling in a specific area into which entry of a specific target object (such as a pedestrian and a bicycle) is restricted. When a specific target object is detected while the subject vehicle M is traveling at the first driving status, the vehicle controller 100 makes the subject vehicle M keep traveling at the first driving status. When a specific target object is detected while the subject vehicle M is traveling at the third driving status, the vehicle controller 100 shifts the driving status thereof to the second driving status or the first driving status. The above-described configuration can promptly change the driving status. For example, when the subject vehicle M is traveling at the third driving status (a driving mainly by the system with monitoring of the system by a driver) of the automated driving, if a "human" is detected besides other vehicles, the vehicle controller 100 shifts the driving status thereof to the first driving status (a driving by the system with supports, and monitoring of the system and the surroundings by a driver).

As explained with reference to the flowchart of FIG. 8, the vehicle controller 100 determines whether a specific target object is detected in a lane in which the subject vehicle M travels or a lane adjacent to the lane of its own. If the detected specific target object is determined to be in the lane of its own or the adjacent lane, the vehicle controller 100 shifts the driving status of the subject vehicle M to the first driving status. If the detected specific target object is not determined to be in the lane of its own or the adjacent lane, the vehicle controller 100 shifts the driving status from the third driving status to the second driving status. This makes it possible to quickly stop the automated driving and to prevent overdetection of a human in an oncoming lane, thus allowing an appropriate vehicle control to be provided.

Figure 13:
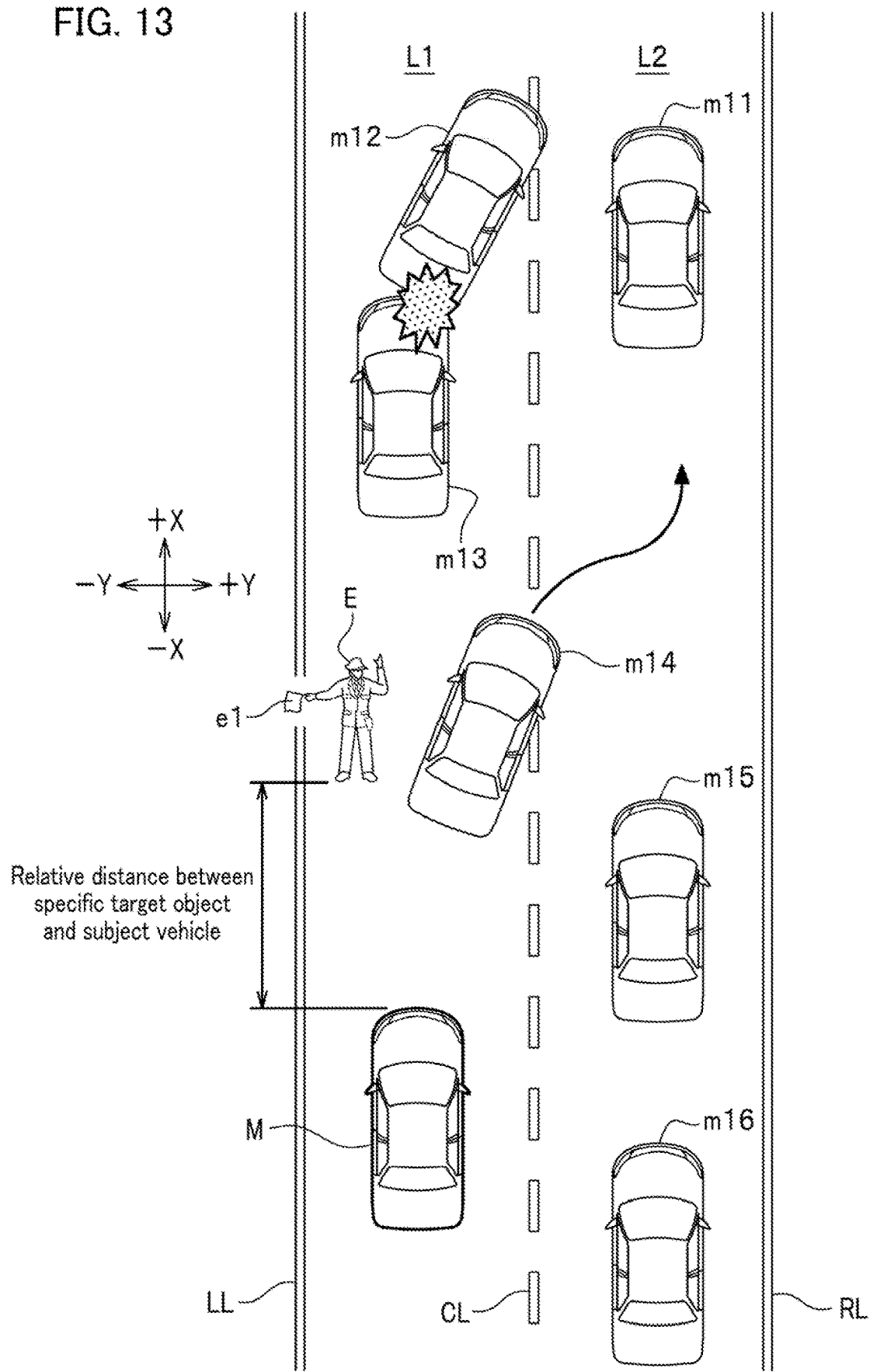
FIG. 13 is a diagram for explaining a vehicle control on the subject vehicle M provided by the vehicle controller according to the embodiment.

FIG. 13 is a diagram for explaining a vehicle control on the subject vehicle M. In FIG. 13: a first lane L1 is a travel lane defined by a lane marking LL and a lane marking CL; a second lane L2 is a travel lane defined by the lane marking CL and a lane marking RL, both of which are the lanes in which a vehicle travels in a direction +X. The lanes L1 and L2 are adjacent to each other for vehicles travelling in the same direction. There is a road shoulder on the left side of the first lane L1.

In the example illustrated in FIG. 13, the subject vehicle M is traveling in the first lane L1. Ahead of the subject vehicle M in the first lane L1, there are other vehicles m12, m13, and m14. The vehicle m12 has been rear-ended by the vehicle m13 and the vehicles m12 and m13 come to a stop at present. There are other vehicles m11, m15, and m16 in the second lane L2.

The vehicle m14: is, as indicated by an arrow in FIG. 13, changing lanes from the first lane L1 in which the rear-end accident has occurred, to the second lane L2; and intends to follow the vehicle m11 which is traveling in the second lane L2.

As illustrated in FIG. 13, upon occurrence of the rear-end accident, a human (for example, a police officer) E is standing at the leftmost of the first lane L1 behind the rear-ended vehicle m13 in the first lane L1 (the lane of its own). The human E is waving a hand flag e1, to thereby signal a message to a traveling vehicle that the rear-end accident has occurred.

In this embodiment, the vehicle controller 100 detects a specific target object (herein, a police officer E) in the lanes L1 and L2 and on a shoulder adjacent to the lane L1. When the subject vehicle M is traveling at the second driving status, the control state change unit 145 shifts the driving status thereof to the first driving status, based on the detection of the human by the surrounding area recognition unit 142. When the subject vehicle M is traveling at the first driving status and a human is detected as described above, the control state change unit 145 keeps the driving status thereof at the first driving status. In such an emergency situation that a human is detected in an area in which he or she is not supposed to be present, the configuration described above makes it possible to promptly shift the driving status as appropriate.

<Operations of Vehicle Control Processing "Change of Shift Timing or Remaining Time Before Shift" by Vehicle Controller 100>

Next is described an example of a change of a shift timing or a remaining time before a shift to the first driving status.

Figure 14:
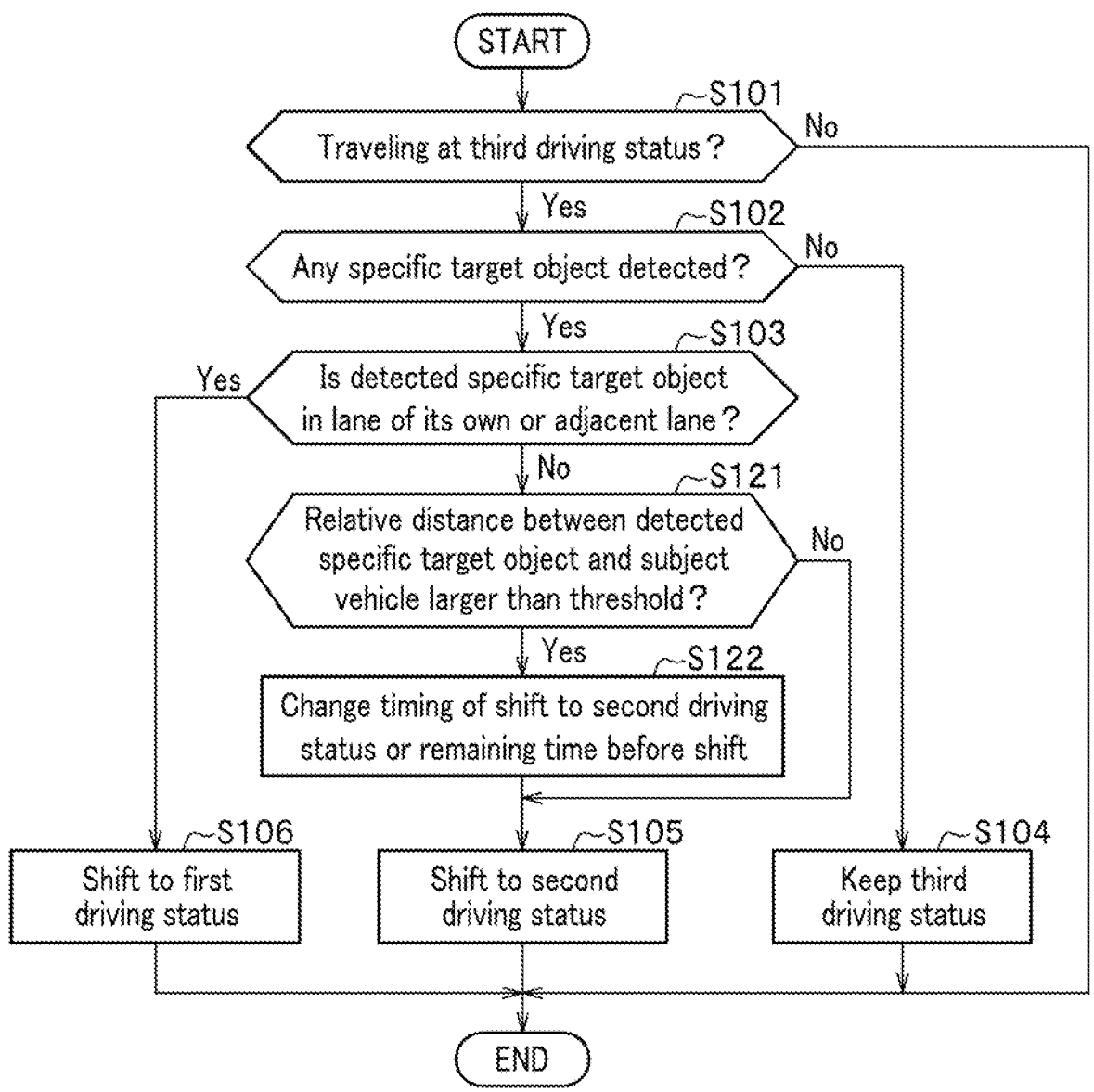
FIG. 14 is a flowchart illustrating an example of a vehicle control processing "change of shift timing or remaining time before shift" performed by the vehicle controller according to the embodiment.

FIG. 14 is a flowchart illustrating an example of a vehicle control processing "change of shift timing or remaining time before shift" performed by the vehicle controller 100. Same step numbers are given to steps same as those in FIG. 8, and a duplicate description of those steps is omitted herein.

In step S103, the control state change unit 145 determines whether the specific target object detected in the specific area (on the expressway) is in a lane in which the subject vehicle M travels or a lane adjacent to the lane of its own. In the above-described example of FIG. 13: the subject vehicle M is traveling in the first lane L1 at the second driving status; and the surrounding area recognition unit 142 has recognized a human (the police officer E) standing on or near a shoulder adjacent to the first lane L1.

In step S103 described above, if the detected specific target object is not determined to be in the lane of its own or the adjacent lane (step S103: No), in step S121, the control state change unit 145 determines whether or not a relative distance between the detected specific target object and the subject vehicle M is larger than a prescribed threshold.

If the relative distance between the detected specific target object and the subject vehicle M is larger than the threshold (step S121: Yes), in step S122, the control state change unit 145: changes a timing of a shift from the third driving status to the second driving status or a remaining time before the shift (in this case, increases the remaining time before the shift); and advances the processing to step S105. If the relative distance between the detected specific target object and the subject vehicle M is equal to or smaller than the threshold (step S121: No), the control state change unit 145: makes no change to the shift timing or the remaining time before the shift; and just advances the processing to step S105.

As described above, when the subject vehicle M is traveling at the third driving status, if a relative distance between a specific target object and the subject vehicle M is larger than a prescribed threshold, a timing of a shift to the second driving status or a remaining time before the shift is changed. This makes it possible to promptly shift the driving status of the subject vehicle M in case of emergency, and, if a detected specific target object is still far away, to moderately shift the driving status thereof.

<Operations of Vehicle Control Processing "Determination of Lane" by Vehicle Controller 100>

Next is described an example of changing a shift to the first driving status or the second driving status depending on whether a specific target object has been detected in a lane in which the subject vehicle M is traveling, or in a lane adjacent to the lane of its own, or on a shoulder.

Figure 15:
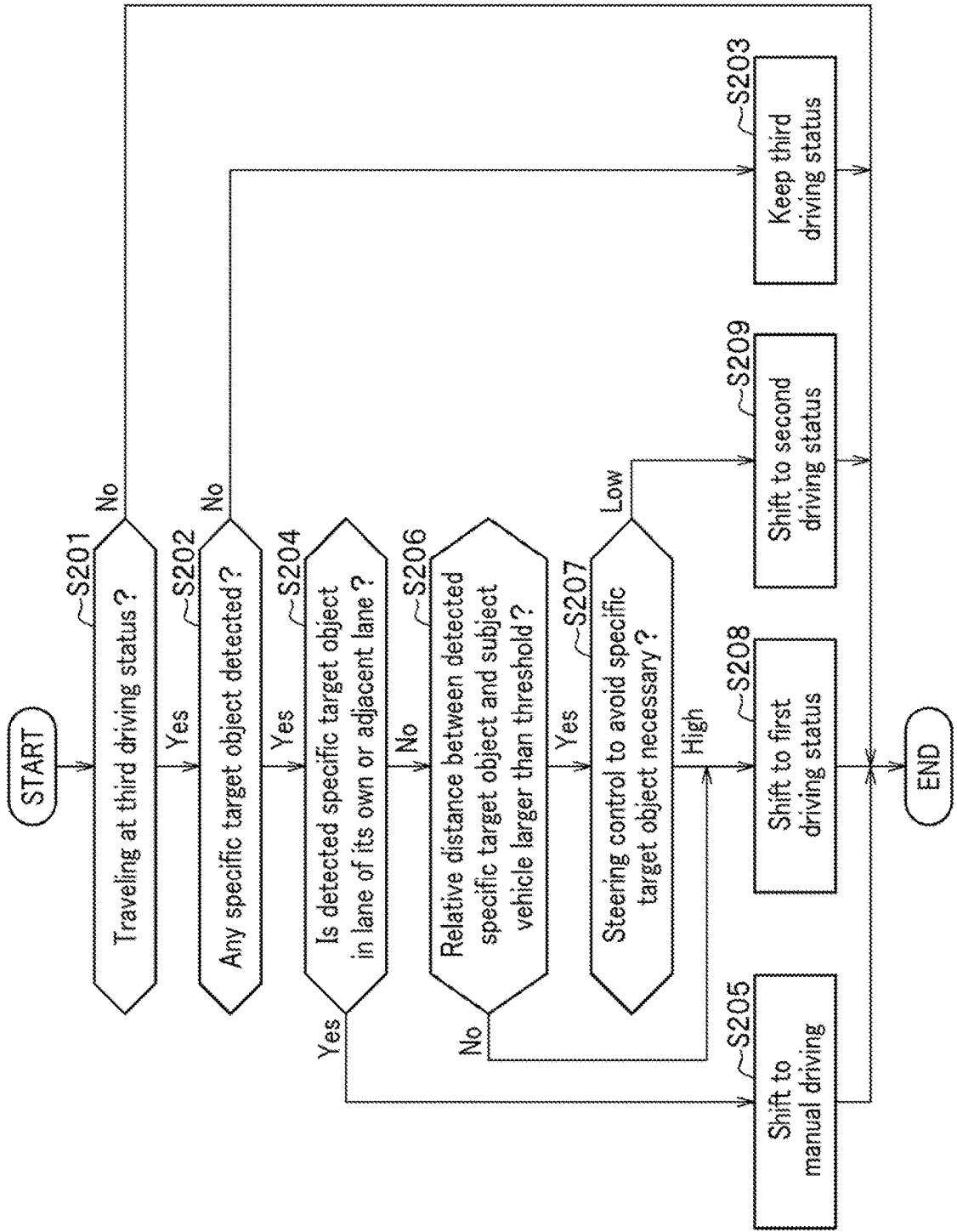
FIG. 15 is a flowchart illustrating an example of a vehicle control processing "determination of lane" performed by the vehicle controller according to the embodiment.

FIG. 15 is a flowchart illustrating an example of a vehicle control processing "determination of lane" performed by the vehicle controller 100.

In step S201, the control state change unit 145 of the automated driving control part 120 determines whether or not the subject vehicle M is traveling at the third driving status. If the subject vehicle M is determined to be traveling at the third driving status, the control state change unit 145 advances the processing to step S202. If the subject vehicle M is not determined to be traveling at the third driving status, the control state change unit 145 terminates the processing In step S202, the control state change unit 145 determines whether or not any specific target object including a human has been detected in a specific area (on an expressway). If no specific target object has been detected (step S202: No), in step S203, the control state change unit 145 makes the subject vehicle M keep on traveling at the third driving status; and terminates the processing.

If any specific target object has been detected in the specific area (on the expressway) (step S202: Yes), a prompt shift of the driving status is required because this means an emergency in which, if the detected specific target object is a human, the human has been detected in an area in which he or she is not supposed to be present. In this case, there are three alternatives: a shift of the driving status from the third driving status down to the first driving status; a shift of the driving status from the third driving status down to the second driving status; and a shift to "manual driving" in which automated driving is stopped. That is, in the automated driving mode, the driving status is shifted such that a surrounding monitoring duty by a vehicle occupant is increased, such as a shift from the third driving status to the first driving status or the second driving status.

In step S204, if the detected specific target object is in the lane of its own or the adjacent lane (step S204: Yes), in step S205, the control state change unit 145: makes the subject vehicle M travel at "manual driving" at which the automated driving is stopped; and terminates the processing.

In step S204 described above, if the detected specific target object is not in the lane of its own or the adjacent lane (step S204: No), in step S206, the control state change unit 145 determines whether or not a relative distance between the detected specific target object and the subject vehicle M is larger than a prescribed threshold.

If the relative distance between the detected specific target object and the subject vehicle M is larger than the threshold (step S206: Yes), the control state change unit 145 advances the processing to step S207. If the relative distance between the detected specific target object and the subject vehicle M is equal to or smaller than the threshold (step S206: No), the control state change unit 145 advances the processing to step S208.

Even when the relative distance between the detected specific target object and the subject vehicle M is larger than the threshold, it is required in some cases for the subject vehicle M to avoid the detected specific target object depending on movement thereof. Thus, in step S207, the control state change unit 145: predicts movement or the like of the detected specific target object; and determines whether necessity for steering control so as to avoid the specific target object is high or low.

If the necessity for steering control so as to avoid the specific target object is high (step S207: high), and if, for example, all or part of the specific target object is located in a lane in which the subject vehicle M is traveling or is going to travel, based on the prediction of movement of the specific target object, in step S208, the control state change unit 145: shifts the driving status of the subject vehicle M from the third driving status to the first driving status at which a driver thereof is required to take the steering wheel; and terminates the processing.

If the necessity for steering control so as to avoid the specific target object is low (step S207: low), and if, for example, the specific target object is not located in a lane in which the subject vehicle M is traveling or is going to travel, based on the prediction of movement of the specific target object, in step S209, the control state change unit 145: shifts the driving status from the third driving status to the second driving status, based on the prediction of movement of the specific target object; and terminates the processing.

As described above, determination of a lane to be shifted is made depending on whether the detected specific target object is located in a lane in which the subject vehicle M is traveling, or in a lane adjacent to the lane of its own or on a shoulder. This makes it possible that, when the detected specific target object does not have a direct influence on the subject vehicle M, for example, when the detected specific target object is in the adjacent lane, on the shoulder, or the like, the driving status is shifted to the second driving status, to thereby prevent an automated driving level from being lowered because of overdetection.

<Operations of Vehicle Control Processing "Prevention of Re-Shift" by Vehicle Controller 100>

Next is described an example in which a re-shift of the driving status is prevented after detection of a human.

Figure 16:
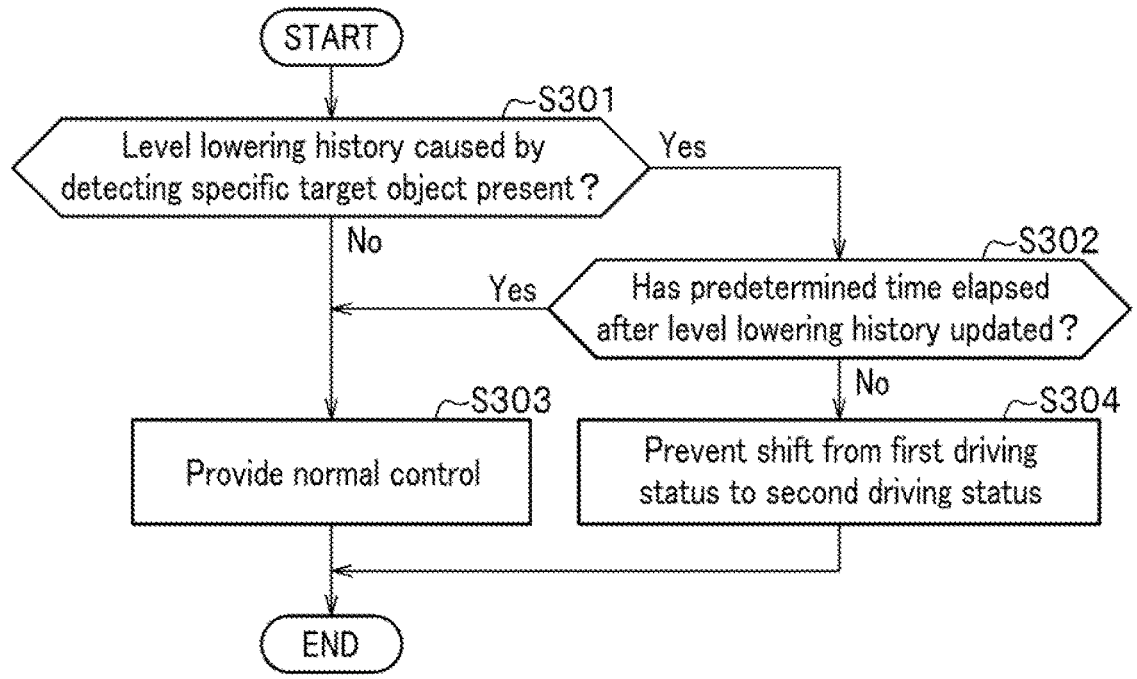
FIG. 16 is a flowchart illustrating an example of a vehicle control processing "prevention of re-shift" performed by the vehicle controller according to the embodiment.

FIG. 16 is a flowchart illustrating an example of a vehicle control processing "prevention of re-shift" performed by the vehicle controller 100.

In step S301, the control state change unit 145 determines whether or not there is a level lowering history of a control state caused by detecting a specific target object. For example, in the flowchart of FIG. 8, a level lowering history when a specific target object has been detected is stored in the storage unit 180. The control state change unit 145 (see FIG. 2) reads the level lowering history from the storage unit 180.

If there is a level lowering history of a control state caused by detecting a specific target object (step S301: Yes), in step S302, the control state change unit 145 determines whether or not a predetermined period of time has elapsed after the level lowering history caused by detecting a specific target object is updated. Even when a level lowering history caused by detecting a specific target object is stored in the storage unit 180, if a prescribed period of time has passed since then, the history may not reflect a travel state anymore. Thus, if a prescribed period of time has elapsed after information of a level lowering history is updated, the information is prevented from being reflected on a vehicle control of interest. However, in a case where, for example, a level lowering history is frequently updated, then a reduction of the prescribed period of time as described above or any other appropriate measure may be taken.

If there is no level lowering history of the control state caused by detecting a specific target object in step S301 (step S301: No) or if the prescribed period of time is determined to have already elapsed after the level lowering history caused by detecting the specific target object is updated in step S302 (step S302: Yes), then, in step S303, the control state change unit 145: continues to provide a normal control (a current driving status control); and terminates the processing.

If the prescribed period of time is not determined to have elapsed after the level lowering history caused by detecting the specific target object is updated in step S302 (step S302: No), in step S304, the control state change unit 145: prevents the driving status from shifting from the first driving status to the second driving status (or restricts the shift compared to that at a normal time): and terminates the processing.

The processing described above: makes it possible to prevent the driving status from re-shifting after the subject vehicle M passes through a specific target object; and realizes a high-level automated driving under secured conditions.

<Operations of Vehicle Control Processing "Degree of Recognizing Human" by Vehicle Controller 100>

Next is described an example in which a travel at the third driving status has an increased recognition rate, compared to that at the second driving status.

Figure 17:
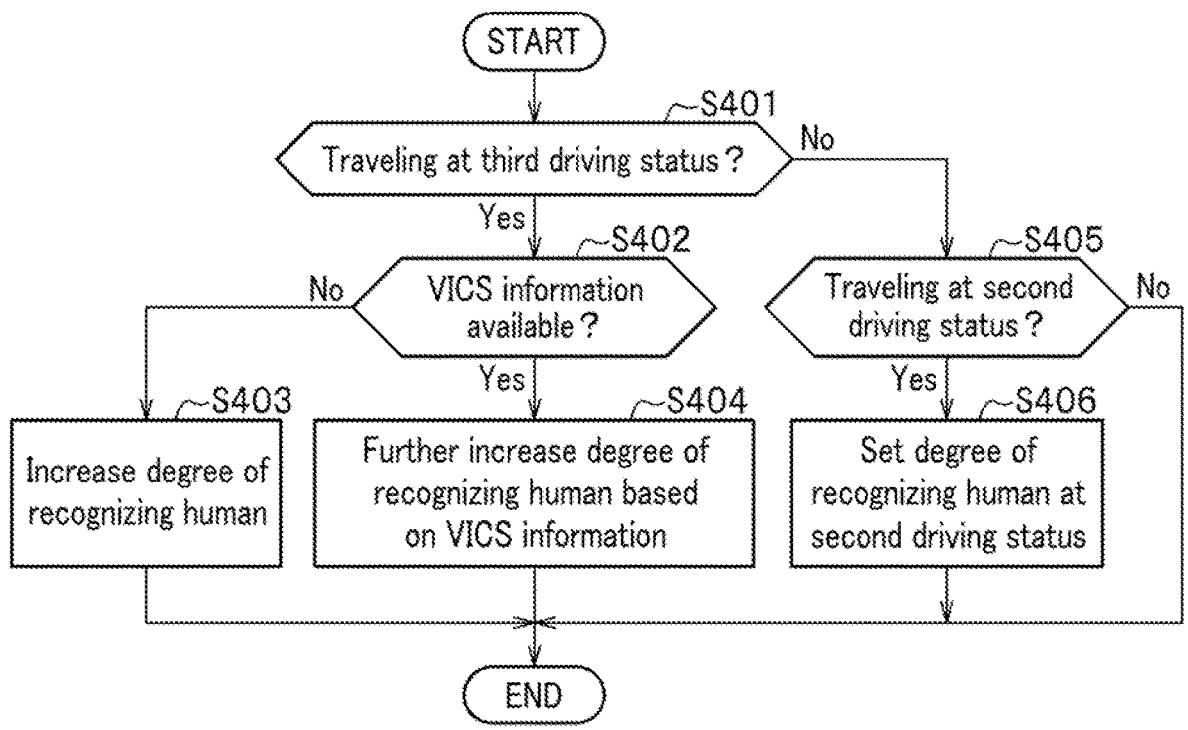
FIG. 17 is a flowchart illustrating an example of a vehicle control processing "degree of recognizing human" performed by the vehicle controller according to the embodiment.

FIG. 17 is a flowchart illustrating a vehicle control processing "degree of recognizing human" performed by the vehicle controller 100.

In step S401, the control state change unit 145 determines whether or not the subject vehicle M is traveling at the third driving status. If the subject vehicle M is determined to be traveling at the third driving status (step S401: Yes), the processing advances to step S402. If the subject vehicle M is not determined to be traveling at the third driving status (step S401: No), the processing advances to step S405.

In step S402, the control state change unit 145 determines whether or not information provided by a road traffic monitoring system including information from VICS (registered trademark) (to be referred to as VICS information hereinafter) is available.

If the VICS information is not determined to be available (step S402: No), in step S403, the control state change unit 145: increases a degree of recognizing a human (a rate of recognizing a human); and terminates the processing. The "increase in a degree of recognizing a human" used herein means that: a section in which an accident or a construction work as a cause of a traffic jam takes place is identified, based on information on traffic jam acquired by the communication device 55; and a human recognized in the section is determined as a police officer, a construction work-related person, a guide concerned, or the like. By distinguishing "a police officer, a construction work-related person, or a guide concerned" from "a pedestrian walking on a shoulder on a way to a bathroom during traffic jam", the following becomes possible. For example, there may be a number of "pedestrians walking on a shoulder on a way to a bathroom during traffic jam" in a heavy traffic congestion on an expressway. Each time such a pedestrian is recognized and the driving status of the subject vehicle M is thereby switched, a driver thereof may feel uncomfortable. Distinguishing such a pedestrian makes it possible to carry out a configuration of preventing a level of the driving status from being lowered. For example, during a traffic jam, even when such a pedestrian is recognized, the subject vehicle M can keep on traveling at the third driving status, without switching the level of the driving status.

If the VICS information is determined to be available (step S402: Yes), in step S404, the control state change unit 145: references the acquired VICS information; further increases the degree of recognizing a human (the human recognition rate); and terminates the processing.

If the subject vehicle M is not determined to be traveling at the third driving status in step S401 described above, the control state change unit 145: advances the processing to step S405; and determines whether or not the subject vehicle M is traveling at the second driving status.

If the subject vehicle M is traveling at the second driving status (step S405: Yes), in step S406, the control state change unit 145: sets a degree of recognizing a human at the second driving status; and terminates the processing. If the subject vehicle M is not traveling at the second driving status (step S405: No), the control state change unit 145 terminates the processing.

In sum, when the subject vehicle M is traveling at the third driving status, a degree of recognizing a human can be increased, compared to that when the subject vehicle M is traveling at the second driving status. This makes it possible to quickly recognize a human after a shift to the TJP at the third driving status.

Also, when information on traffic jam is already acquired by means of the VICS information, the degree of recognizing a human can be further increased, compared to that when the information on traffic jam is not acquired. Using the information on traffic jam with a higher accuracy makes it possible to conduct TJP at the second driving status with more reliability and to quickly recognize a human after a shift to the TJP.

<Operations of Vehicle Control Processing "Human and Feature Target Object" by Vehicle Controller 100>

Next is described an example in which a human together with a feature target object are recognized so as to prevent a false detection of a human.

Figure 18:
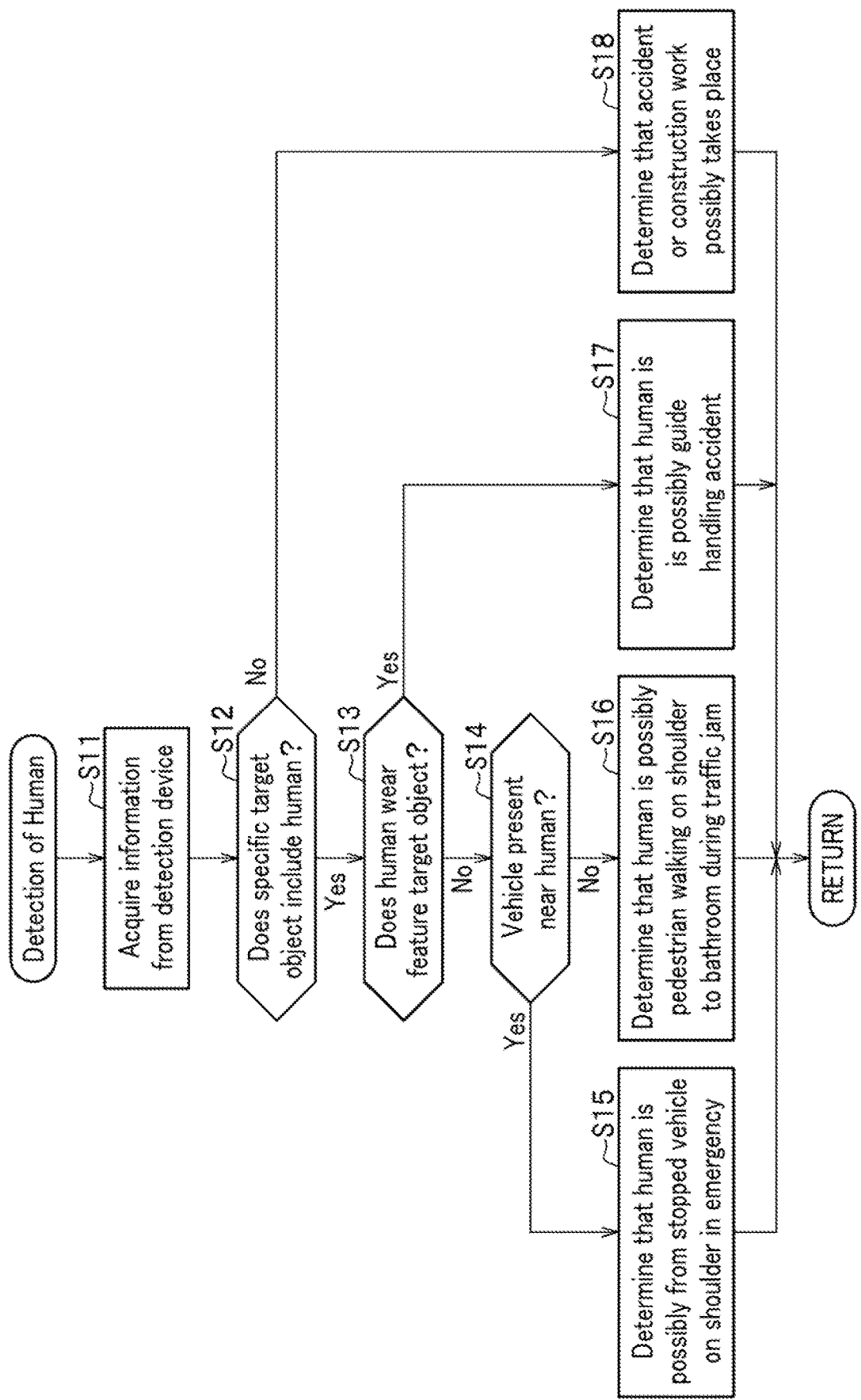
FIG. 18 is a flowchart illustrating an example of a vehicle control processing "human and feature target object" performed by the vehicle controller according to the embodiment.

FIG. 18 is a flowchart illustrating an example of a vehicle control processing "human and feature target object" performed by the vehicle controller 100. The automated driving control part 120 (see FIG. 2) repeatedly performs steps in the flowchart on a predetermined cycle.

In step S11, the automated driving control part 120 acquires information from the detection device DD (see FIG. 2).

In step S12, the automated driving control part 120 determines whether or not a detected specific target object includes a human. If the detected specific target object is determined to include a human (step S12: Yes), in step S13, the automated driving control part 120 determines whether or not the detected human wears a feature target object such as a light-reflective vest and a guide rod.

If the detected human is not determined to wear a feature target object such as a light-reflective vest and a guide rod (step S13: No), in step S14, the automated driving control part 120 determines whether or not a (parked) vehicle is present near the detected human.

If a (parked) vehicle is determined to be present near the detected human (step S14: Yes), in step S15, the automated driving control part 120 determines that there is a possibility that the detected human is a person who has stopped his or her vehicle with failure on a shoulder and has got out of the vehicle to fix the problem or the like.

A result determined in step S15 and respective results to be determined in step S16 to step S18 hereinafter are used in, for example, step S102 (whether or not a specific target object has been detected) in each of FIG. 8, FIG. 14, and FIG. 19 to be described later. This makes it possible to improve accuracy of detecting a specific target object in respective vehicle control processings of FIG. 8, FIG. 14, and FIG. 19. That is, steps of the flowchart of FIG. 18 are executed when invoked by a subroutine call in step S102 in FIG. 8, FIG. 14, and FIG. 19.

If a vehicle is not determined to be present near the detected human in step S14 (step S14: No), in step S16, the automated driving control part 120 determines that there is a possibility that the detected human is a pedestrian walking on a shoulder on a way to a bathroom during traffic jam.

If the detected human is determined to wear a feature target object such as a light-reflective vest and a guide rod in step S13 (step S13: Yes), in step S17, the automated driving control part 120 determines that the detected human is a guide handling an accident.

If the specific target object detected in step S12 is not determined to include a human (step S12: No), in step S18, the automated driving control part 120 determines that there is a possibility that, though a human is not present, an accident or a construction work takes place.

Determination on whether or not a specific target object wears a feature target object can enhance accuracy of recognizing the specific target object in the vehicle control processing. It is assumed in this embodiment, however, a similar vehicle control is provided independently of whether or not a human as a specific target object wears a feature target object.

<Operations of Vehicle Control Processing "Lane in which Human is Detected" by Vehicle Controller 100>

Next is described an example in which a vehicle control is changed based on a relation between a position in which a human is detected and a position of the subject vehicle M.

Figure 19:
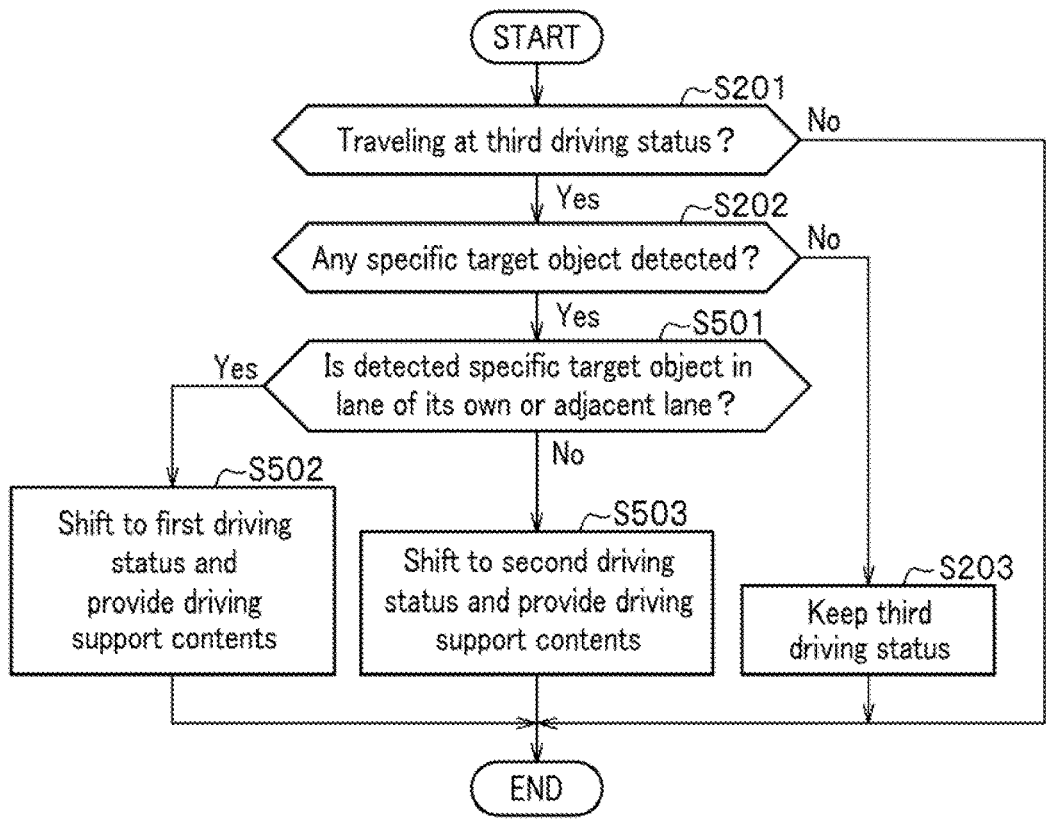
FIG. 19 is a flowchart illustrating an example of a vehicle control processing "lane in which human is detected" performed by the vehicle controller according to the embodiment.

FIG. 19 is a flowchart illustrating an example of a vehicle control processing "lane in which human is detected" performed by the vehicle controller 100. Same step numbers are given to steps same as those in FIG. 15, and a duplicate description of those steps is omitted herein.

In step S201, the control state change unit 145 determines whether or not the subject vehicle M is traveling at the third driving status. If the subject vehicle M is determined to be traveling at the third driving status, the control state change unit 145 advances the processing to step S202. If the subject vehicle M is not determined to be traveling at the third driving status, the control state change unit 145 terminates the processing.

In step S202, the control state change unit 145 determines whether or not a human as a specific target object has been detected in a specific area (on an expressway). If any human as the specific target object is not determined to have been detected (step S202: No), in step S203, the control state change unit 145: keeps the subject vehicle M traveling at third driving status; and terminates the processing.

If any human as the specific target object is determined to have been detected in the specific area (on the expressway) (step S202: Yes), in step S501, the control state change unit 145 determines whether or not a position in which the human has been detected is in a lane same as that in which the subject vehicle M travels. For example, in FIG. 13 described above, a human (for example, a police officer) E is standing in the first lane L1 (in the same lane in which the subject vehicle M travels). The human E is waving the handflag e1 so as to make a traveling vehicle aware of occurrence of a rear-end accident. If such a human is detected in the same lane in which the subject vehicle M travels, a degree of emergency becomes high.

If the position in which the human has been detected is in the lane same as that in which the subject vehicle M travels (step S501: Yes), in step S502, the control state change unit 145 shifts the driving status thereof from the third driving status to the first driving status. As described above, the first driving status requires more duty of monitoring the surrounding of the subject vehicle M by a vehicle occupant thereof than that at the second driving status. When the position in which the specific target object has been detected is in the lane same as that in which the subject vehicle M travels; and then, the driving status is shifted from the third driving status to the first driving status, driving support contents provided at the first driving status are reduced, compared to those at a normal first driving status. Some examples of reducing the driving support contents include that: ALC is not conducted; a following distance of the subject vehicle M is increased; and acceleration is restrained.

If the position in which the specific target object has been detected is not in the lane in which the subject vehicle M travels (step S501: No), in step S503, the control state change unit 145: shifts the driving status from the third driving status to the second driving status; and provides driving supports for traveling at the second driving status. That is, different driving support contents are provided depending on whether or not the position in which the specific target object has been detected is in the lane same as that in which the subject vehicle M travels.

As described above, respective driving support contents after shifts to the second driving status and to the first driving status are made different from each other, depending on whether a position in which the specific target object has been detected is in a lane same as that in which the subject vehicle M travels, or not, respectively.

Additionally, when the position of the detected human is in the same lane, driving support contents are further reduced at the first driving status. This makes it possible to, when the position of the detected human is in the same lane, lower an automated driving level and further reduce the driving support contents.

<Operations of Vehicle Control Processing "Function Limit Upon Detection of Human" by Vehicle Controller 100>

Next is described an example in which functions are limited upon detection of a human.

Figure 20:
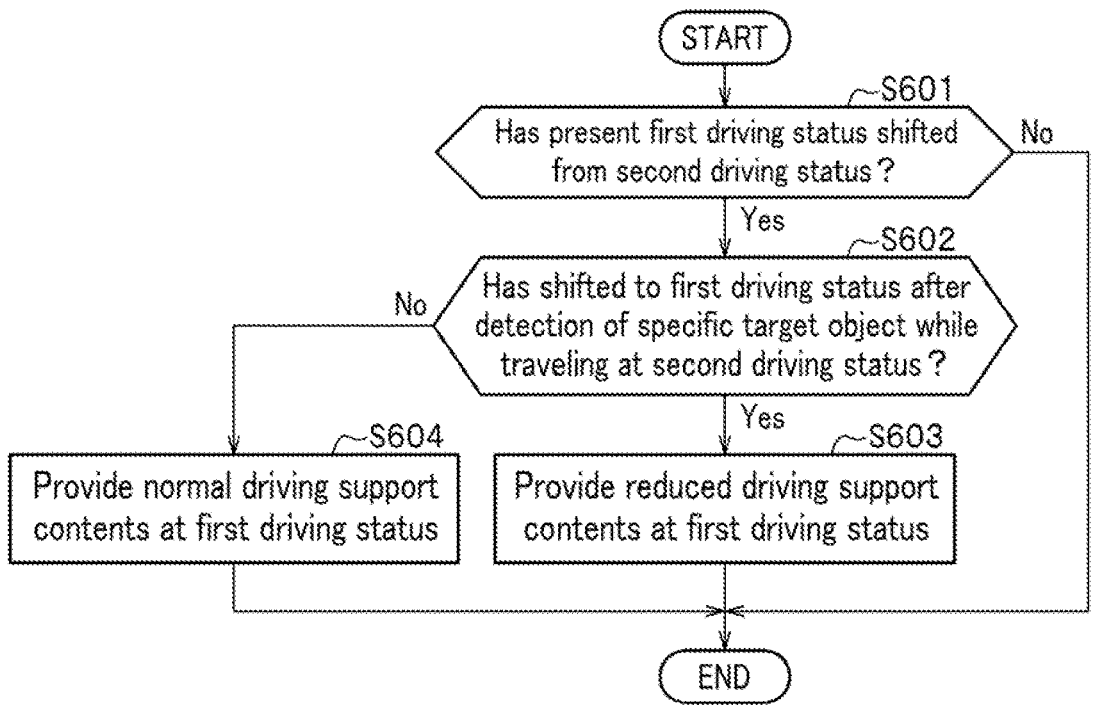
FIG. 20 is a flowchart illustrating an example of a vehicle control processing "function limit upon detection of human" performed by the vehicle controller according to the embodiment.

FIG. 20 is a flowchart illustrating an example of a vehicle control processing "function limit upon detection of human" performed by the vehicle controller 100.

In step S601, the control state change unit 145 determines whether or not a present driving status of the first driving status has been shifted from the second driving status. If the present first driving status is not determined to have been shifted from the second driving status (step S601: No), the control state change unit 145 terminates the processing.

If the present first driving status is determined to have been shifted from the second driving status (step S601: Yes), in step S602, the control state change unit 145 determines whether or not the shift from the second driving status to the first driving status has been made in response to detection of a specific target object (a human) while traveling at the second driving status.

If the shift to the first driving status is determined to have been made in response to the detection of a specific target object (a human) while traveling at the second driving status (step S602: Yes), in step S603, the control state change unit 145 provides reduced driving support contents than those normally provided at the present first driving status. Some examples of reducible driving support contents include that: ALC is not conducted; a following distance of the subject vehicle M is increased; and acceleration is restrained.

If the shift to the first driving status is determined to have been made not in response to a detection of a specific target object (a human) while traveling at the second driving status (step S602: No), in step S604, the control state change unit 145 provides normal driving supports at the first driving status.

That is, when an automated driving level of the driving status is lowered in response to detection of a human, functions at the lowered driving status can be limited. This can reduce a possibility of being involved in a dangerous situation.

As described above, the vehicle controller 100 according to this embodiment includes: the surrounding area recognition unit 142 configured to recognize a surrounding state of the subject vehicle M which travels in a lane on a road; the human detection unit 143 configured to detect a specific target object (such as a human and a bicycle) in a specific area (on an expressway) into which entry of the specific target object is restricted; and the automated driving control part 120 configured to provide control such that the subject vehicle M follows a vehicle traveling ahead thereof, based on a result detected by the surrounding area recognition unit 142. The driving control part 120 is configured to: make the subject vehicle operate at at least one of a first driving status, and a second driving status which has an automated degree higher than that of the first driving status or has a task required to be done by a vehicle occupant of the subject vehicle less than that of the first driving status. When the subject vehicle M is traveling at the first driving status and the human detection unit 143 has detected a specific target object, the automated driving control part 120 keeps the driving status of the subject vehicle M unchanged at the first driving status. When the subject vehicle M is traveling at the second driving status and the detection unit has detected a specific target object, the automated driving control part 120 shifts the support status of the subject vehicle from the second driving status to the first driving status.

With the above-described configuration, when the subject vehicle M is traveling at the second driving status (a driving mainly by the system with monitoring of the system by a driver) of the automated driving and a human has been detected, the vehicle controller 100 shifts the driving status thereof to the first driving status (a driving by the system with supports, and monitoring of the system and the surroundings by a driver). When the subject vehicle M is traveling at the first driving status and a human has been detected, the vehicle controller 100 keeps the driving status unchanged at the first driving status (When the subject vehicle M is traveling at the first driving status, even when a human has been detected, the vehicle controller 100 keeps the driving status from being shifted). If a human is detected in a specific area (on an expressway) in which such a human is not supposed to be present, an emergency may have occurred and the configuration described above makes it possible to promptly shift the driving status as appropriate. In particular, when an uncertain situation arises while traveling at a high automated driving status, the driving status can be changed quickly.

In this embodiment, the human detection unit 143 is configured to detect, in the specific area, a specific target object: in a lane in which the subject vehicle travels; in a lane or on a shoulder adjacent to the lane in which the subject vehicle travels; on a shoulder having a travelling direction same as that of the lane in which the subject vehicle travels, other than the adjacent shoulder; and in a combination thereof. This makes it possible to prevent overdetection of a human or the like present in an oncoming lane.

In this embodiment, when the subject vehicle M is traveling at the second driving status, the automated driving control part 120 is configured to change a timing of a shift to the first driving status or a remaining time before the shift to the first driving status, based on a relative distance between the detected specific target object and the subject vehicle M itself. That is, if a specific target object has been detected, a remaining time before a shift to be made can be changed based on a positional relation between the detected specific target object and the subject vehicle M itself. This makes it possible to quickly shift the driving status in case of emergency, and, if the relative distance between the specific target object and the subject vehicle M is still large, a moderate shift of the driving status can be made.

In this embodiment, in a case where: the human detection unit 143 has detected a specific target object while the subject vehicle M is traveling at the second driving status; the support status of the subject vehicle is thereby shifted from the second driving status to the first support status; and the subject vehicle M is presently travel at the first driving status, then the automated driving control part 120 prevents the driving status from shifting from the present first driving status to the second driving status (or restricts the shift compared to that at a normal time). That is, after a human has been detected, a subsequent re-shift is limited. This makes it possible to issue a request for a re-shift after the subject vehicle M passes through the specific target object, and thereby provide a high-level automated driving in a secured environment.

In this embodiment, the automated driving control part 120 increases a degree of recognizing a human as a specific target object, from among one or more specific target objects, when the subject vehicle M is traveling at the second driving status, compared to that when the subject vehicle M is traveling at the first driving status. That is, a rate of recognizing a human is raised at the second driving status, compared to that at the first driving status. This makes it possible to quickly recognize a human after a shift to TJP.

In this embodiment, the subject vehicle M includes the communication device 55 that is configured to acquire information on traffic jam. The automated driving control part 120 increases a degree of recognizing a human as a specific target object, based on the information on traffic jam acquired by the communication device 55. By acquiring information on traffic jam using the VICS information, a section in which an accident or a construction work as a cause of a traffic jam takes place can be identified. A human recognized in the section in which an accident or a construction work takes place is determined as a police officer, a construction work-related person, a guide concerned, or the like, thus allowing the rate of recognizing a human to be further increased. This makes it possible to prevent an erroneous detection of a pedestrian walking on a shoulder on a way to a bathroom during traffic jam.

In this embodiment, the human detection unit 143 detects: a human or an article representing a human as a specific target object; and a feature target object attached to the human or the article representing the human. The automated driving control part 120 changes the driving status of the subject vehicle M, based on recognition of a feature target object, in addition to a human or an article representing a human. For example, if a human wears a feature target object (such as a light-reflective vest and a guide rod), it can be determined that the human is a police officer, a construction work-related person, a guide concerned, or the like. This makes it possible to prevent an erroneous detection of a pedestrian walking on a shoulder on a way to a bathroom during traffic jam.

In this embodiment, in a case where the driving status of the subject vehicle M is shifted from the second driving status to the first driving status, when a position in which the specific target object is detected is in a lane same as that in which the subject vehicle M is traveling, the automated driving control part 120 provides less driving support contents, compared to those provided when a position in which the specific target object is detected is not in a lane same as that in which the subject vehicle M is traveling. That is, when a human is detected in a lane same as that in which the subject vehicle M is traveling, an automated driving level of the driving status can be lowered and driving support contents provided at the lowered driving status can be limited. For example, when the driving status is shifted from the second driving status to the first driving status, and, at the same time, when a position in which a specific target object has been detected is in a lane same as that in which the subject vehicle M travels, the first driving status under such conditions is provided as a first driving status with driver's surrounding monitoring and with steering wheel holding. This makes it possible to provide less driving support contents when a human has been detected in a lane of the subject vehicle M of its own.

In this embodiment, in a case where: the support status of the subject vehicle has been shifted from the second driving status to the first driving status; and the subject vehicle is presently traveling at the first driving status, if the shift from the second driving status to the first driving status has been made in response to detection of a specific target object while traveling at the second driving status, the automated driving control part 120 makes the subject vehicle provided with less support contents, compared to those provided when the shift has been made without detection of a specific target object. For example, when an automated driving level of the driving status is lowered in response to detection of a human, functions at the lowered driving status can be limited. This can reduce a possibility of being involved in a dangerous situation.

The above-described embodiment is intended to be illustrative of the present invention in an easily understandable manner. The present invention is not limited to that includes all of the components explained in the embodiment. A structure of the embodiment can be substituted by or added to that of another embodiment. Part of the structure of the embodiment can be substituted by or added to that of another embodiment. Part of the structure of the embodiment can be deleted.

The vehicle controller and the vehicle control method of the present invention can be realized by a program for causing to function as each of the vehicle controller and the vehicle control method. The program may be stored in a computer readable storage medium.

Part or all of a configuration, a function, a processing part, a processing unit, or the like described above can be realized by hardware by means of, for example, designing using an integrated circuit. The aforementioned configuration, function, or the like can be embodied by software in which a processor interprets and executes a program which realizes the function. Information such as a program, a table, a file, or the like for realizing such a function can be stored in a storage device including a memory, a hard disk, and a SSD (Solid State Drive) or in a storage medium including an IC (Integrated Circuit) card, a SD (Secure Digital) card, and an optical disc.

DESCRIPTION OF REFERENCE NUMERALS 20 finder
30 radar
40 camera
50 navigation device
55 communication device
60 vehicle sensor
70 HMI
100 vehicle controller
110 target lane determination part
120 automated driving control part (driving control part)
130 automated driving mode control unit
140 recognition unit
141 subject vehicle position recognition unit
142 surrounding area recognition unit
143 human detection unit (detection unit)
143A AI accelerator (detection unit)
144 traveling plan creation unit
145 control state change unit
146 notification control unit
147 locus generation unit
147A travel state determination unit
147B locus candidate generation unit
147C evaluation and selection unit
150 switching control unit
160 travel control part
170 HMI control unit
180 storage unit
200 travel drive force output device
210 steering device
220 brake device
M subject vehicle
DD detection device

The invention claimed is:

1. A vehicle controller of a subject vehicle, comprising:
a processor configured to:
recognize a surrounding state of the subject vehicle which travels in a through lane on a specific road, the specific road having two or more lanes each way, entry of a pedestrian into the specific road being restricted;
detect a pedestrian in the specific road, the specific road including: the through lane in which the subject vehicle travels; an adjacent lane or an adjacent shoulder adjacent to the through lane in which the subject vehicle travels; a shoulder having a travelling direction same as that of the through lane in which the subject vehicle travels, other than the adjacent shoulder; and a combination thereof;
provide control such that the subject vehicle follows a vehicle traveling ahead thereof, based on the detection;
make the subject vehicle operate in at least one of a first support status, and a second support status which has an automated degree higher than that of the first support status or has a task required to be done by a vehicle occupant of the subject vehicle less than that of the first support status, the second support status being realized only when the subject vehicle is traveling on the through lane in the specific road;
when the subject vehicle is traveling in the first support status and the pedestrian has been detected therein, keep a support status of the subject vehicle unchanged in the first support status; and when the subject vehicle is traveling in the second support status and when the pedestrian has been detected in the through lane, the adjacent lane or the adjacent shoulder, or a combination thereof, in the specific road, shift the support status of the subject vehicle from the second support status to the first support status, and when the pedestrian has been detected not in the through lane, the adjacent lane or the adjacent shoulder, or the combination thereof, in the specific road, keep the support status of the subject vehicle unchanged in the second support status.

2. The vehicle controller according to claim 1,
wherein, when the subject vehicle is traveling in the second support status, the processor is configured to change a timing of a shift to the first support status or a remaining time before the shift to the first support status, based on a relative distance between the detected pedestrian and the subject vehicle itself.

3. The vehicle controller according to claim 1,
wherein, in a case where: the pedestrian has been detected while the subject vehicle is traveling in the second support status; the support status of the subject vehicle is thereby shifted to the first support status; and the subject vehicle is presently traveling in the first support status, then the processor is configured to prevent the support status from shifting from the present first support status to the second support status.

4. The vehicle controller according to claim 1,
wherein the processor detects: a human or an article representing a human as the pedestrian; and a feature target object attached to the human or the article representing the human.

5. The vehicle controller according to claim 1,
wherein, in a case where the support status of the subject vehicle is shifted from the second support status to the first support status, when a position in which the pedestrian is detected is in the through lane same as that in which the subject vehicle is traveling, less driving support contents are provided, compared to those provided when a position in which the pedestrian is detected is not in the through lane same as that in which the subject vehicle is traveling.

6. The vehicle controller according to claim 1,
wherein, in a case where: the support status of the subject vehicle has been shifted from the second support status to the first support status; and the subject vehicle is presently traveling at the first support status, when the shift from the second support status to the first support status has been made in response to detection of the pedestrian, then less support contents are provided, compared to those provided when the shift has been made without detection of the pedestrian.

7. A vehicle including the vehicle controller according to claim 1.

8. A vehicle control method performed by a vehicle controller of a subject vehicle, the vehicle controller including a processor configured to recognize a surrounding state of the subject vehicle which travels in a through lane on a specific road having two or more lanes each way, entry of a pedestrian into the specific road being restricted, detect a pedestrian in the specific road, the specific road in which the pedestrian is detected including: the through lane in which the subject vehicle travels; an adjacent lane or an adjacent shoulder adjacent to the through lane in which the subject vehicle travels; a shoulder having a travelling direction same as that of the through lane in which the subject vehicle travels, other than the adjacent shoulder; and a combination thereof, and provide control such that the subject vehicle follows a vehicle traveling ahead thereof, based on the detection, the vehicle control method comprising the steps of:

making the subject vehicle operate in at least one of a first support status, and a second support status which has an automated degree higher than that of the first support status or has a task required to be done by a vehicle occupant of the subject vehicle less than that of the first support status, the second support status being performed only when the subject vehicle is traveling on the through lane in the specific road;

when the subject vehicle is traveling in the first support status and the pedestrian has been detected therein, keeping a support status of the subject vehicle unchanged in the first support status; and when the subject vehicle is traveling in the second support status and when the pedestrian has been detected in the through lane, the adjacent lane or the adjacent shoulder, and a combination thereof, in the specific road, shifting the support status of the subject vehicle from the second support status to the first support status, and when the pedestrian has been detected not in the through lane, the adjacent lane or the adjacent shoulder, or the combination thereof, in the specific road, keeping the support status of the subject vehicle unchanged in the second support status.

\* \* \* \* \*